US009177078B1

(12) United States Patent  (10) Patent No.: US 9,177,078 B1
Assefa et al.  (45) Date of Patent: Nov. 3, 2015

(54) SYSTEMS AND METHODS FOR ANALYSIS OF INTERNATIONAL EDUCATION CREDENTIAL EQUIVALENCE

(75) Inventors: Mariam Assefa, New York, NY (US); Steven Boss, New York, NY (US); Karyadi Kusumo, Elmhurst, NY (US); Margarita Sianou, Astoria, NY (US)

(73) Assignee: World Education Services, Inc., New York, NY (US)

( * ) Notice: Subject to any disclaimer, the term of this patent is extended or adjusted under 35 U.S.C. 154(b) by 835 days.

(21) Appl. No.: 12/709,236

(22) Filed: Feb. 19, 2010

Related U.S. Application Data

(60) Provisional application No. 61/155,483, filed on Feb. 25, 2009.

(51) Int. Cl.
*G06F 17/30* (2006.01)
*G06Q 50/20* (2012.01)

(52) U.S. Cl.
CPC ...... *G06F 17/30917* (2013.01); *G06Q 50/2053* (2013.01)

(58) Field of Classification Search
CPC ............ G06F 17/30917; G06Q 50/2053
See application file for complete search history.

(56) References Cited

U.S. PATENT DOCUMENTS 4,282,580 A * 8/1981 McGuire et al. .............. 708/445
4,715,011 A * 12/1987 Brittan ......................... 708/445
6,687,720 B1 * 2/2004 Colver et al. ................. 708/162
2006/0257841 A1 * 11/2006 Mangano ...................... 434/354
2008/0270166 A1 * 10/2008 Morin et al. ...................... 705/1
2009/0083062 A1 * 3/2009 Gupta ............................... 705/1

OTHER PUBLICATIONS

ForeignCredits.com, NPL "Foreign Diploma Evaluation", May 4, 2006.*
Texas Southern University, NPL "GPA Converter", Aug. 21, 2006.*
Texas Southern University, NPL "Office of Enrollment Services Grade Conversion Scale", Sep. 2001.*
Anthony Macera, NPL "What's your GPA?", Oct. 28, 2007.*
Xiyang Chen, NPL "GPA Calculating Spreadsheet", Nov. 14, 2007.*
NYC Department of Education, NPL "Evaluating Foreign Transcripts: The A-Z Manual", Sep. 2006, NYC Department of Education.*

* cited by examiner

*Primary Examiner* — Rehana Perveen
*Assistant Examiner* — Huen Wong
(74) *Attorney, Agent, or Firm* — Foley & Lardner LLP

(57) ABSTRACT

A system for converting educational credentials from a first country to credentials for a second country includes a database configured to store data related to at least one of grading scales, credit scales, course descriptions, rankings, and weighting for educational credentials and a processor configured to receive data from a user related to course grades and credits earned in the first country and a selection of the second country. The processor retrieves data from the database based on the user data and converting the course grades and credits earned in the first country to grades, credits, and grade point averages for use in the second country based on the data from the database. The processor provides the grades, credits, and grade point averages equivalent in the second country to an electronic display for display to the user.

20 Claims, 19 Drawing Sheets

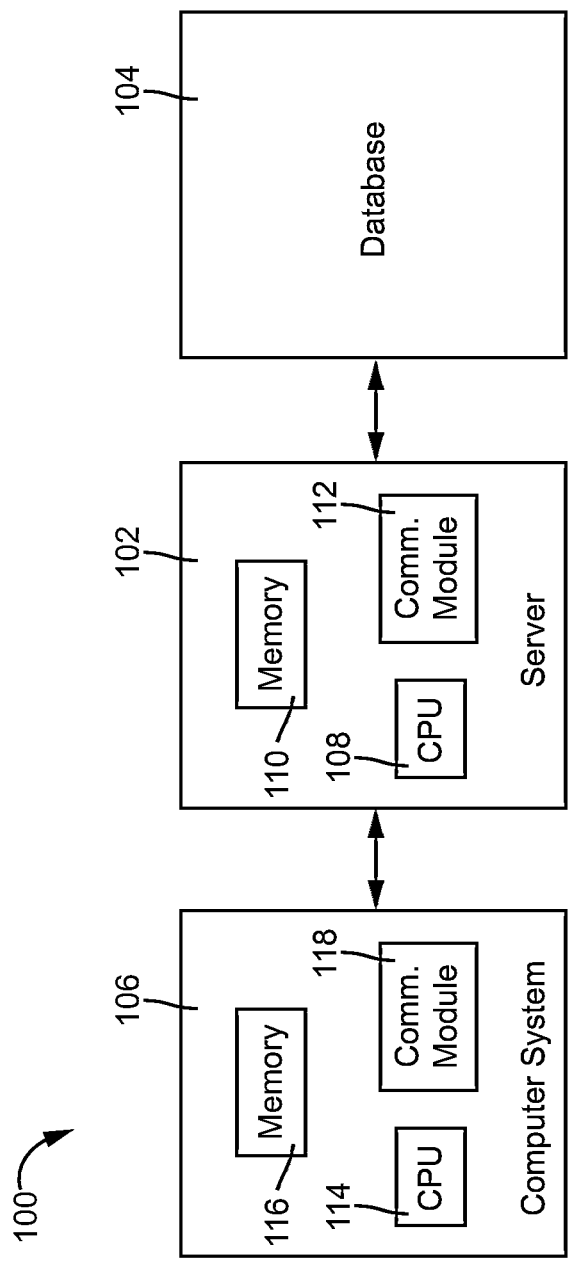

Welcome to the WES IGPA Calculator.

* indicates a required field

| | |
|---|---|
| Enter Student Name (optional): | Sample Applicant |
| Select Country of Education:* | Albania |
| Select Destination Country:* | United States of America |
| Select Level of Study in Home Country:* | Post - Secondary |
| Search Institution Name:* | Search Institution |

FIG. 2

Search for Institution

Enter at least one word from the name of the institution in the original language. (To see a list of all available institutions, please leave the box blank and click on the 'Search' button.)

[ Search ] [ Cancel ]

FIG. 3

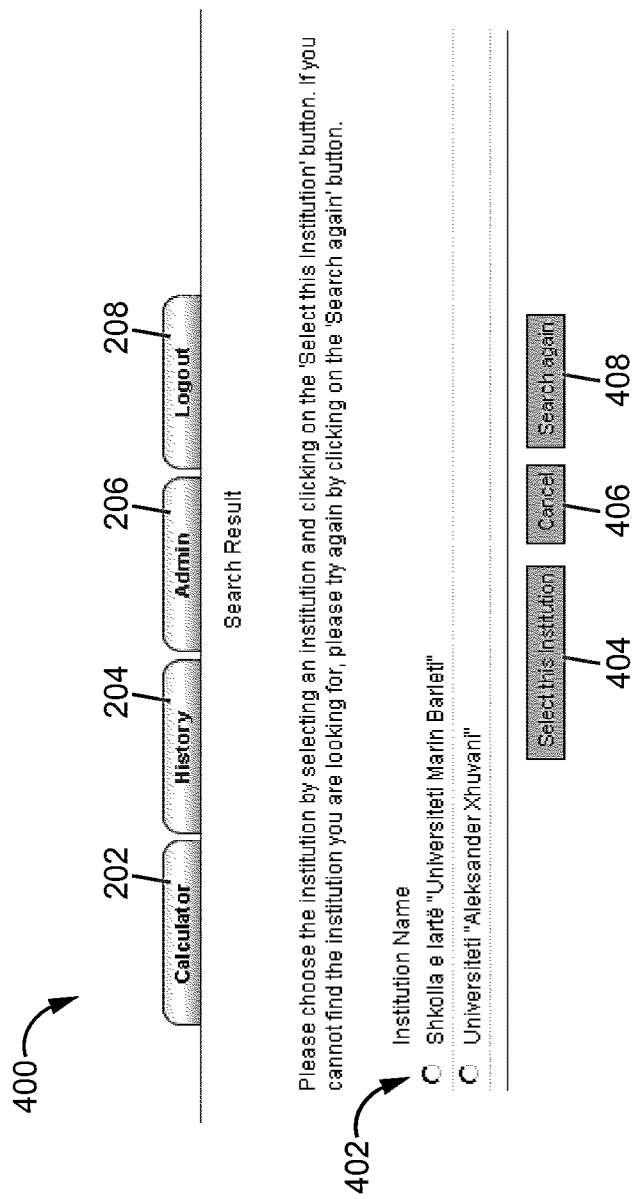

FIG. 6

| | | 202 | 204 | 206 | 208 | |
|---|---|---|---|---|---|---|
| | | Calculator | History | Admin | Logout | |

708 — 🖨 Print

IMPORTANT: Please review results to confirm accuracy. To revise any data entered, click the "EDIT" button at bottom of the screen. To accept and archive the results, click the "ACCEPT" button.

Home Country: Albania — 702
Destination Country: U.S. — 704
Student Name: Sample Applicant — 706

| COURSE TITLE | MAJOR COURSES | HOME CREDIT | HOME GRADE | U.S. Credits | U.S. GRADE |
|---|---|---|---|---|---|
| Mathematical Analysis | | 1 | 6 | 3.00 | C |
| Advanced Foundation Engineering | ✓ | 2 | 7 | 6.00 | B |
| Basic Engineering Science | ✓ | 1 | 5 | 3.00 | C |
| Building Materials and Construction | ✓ | 2 | 7 | 6.00 | B |
| Constructions Mechanics | ✓ | 2 | 6 | 6.00 | C |
| Engineering Science and Mathematics | | 1 | 8 | 3.00 | B |
| Linear Algebra | | 1 | 5 | 3.00 | C |

712 ─ 714 ─

710

| | |
|---|---|
| TOTAL U.S. Credits: | 30 — 716 |
| TOTAL Major Credits: | 21 — 718 |
| GPA: | 2.50 — 720 |
| Major GPA: | 2.57 — 722 |

[ Start Over ] — 724

| Country ID | Level of Study ID | Institution ID | Institution Name | Institution Status |
|---|---|---|---|---|
| 155 | | 110889 | Abu Dhabi University | A |
| 155 | 1 | 110890 | Ajman University of Science and Technology (AUST Network) | A |
| 155 | 1 | 110891 | Al Ain University of Science and Technology | A |
| 155 | 1 | 110892 | Al Ghurair University | A |
| 155 | 1 | 110893 | Al Hosn University | A |
| 155 | 1 | 110894 | Al Khawarizmi International College | A |
| 155 | 1 | 110895 | Dubai Aerospace Enterprise University | A |
| 155 | 1 | 110896 | Dubai Medical College for Girls | A |
| 155 | 1 | 110897 | Dubai University College (DUC) | A |
| 155 | 1 | 110898 | Emirates College for Management and Information Technology | A |
| 155 | 1 | 110899 | Emirates College of Technology | A |
| 155 | 1 | 110900 | Emirates Institute for Banking and Financial Studies | A |
| 155 | 1 | 110901 | Etisalat University College | A |
| 9 | 1 | 108466 | Universiteti i Tiranes | A |
| 9 | 1 | 108467 | Universiteti Politeknik | A |
| 9 | 1 | 108468 | Universiteti Bujqesor i Tiranes | A |
| 9 | 1 | 108469 | Universiteti "Luigj Gurakuqi" | A |
| 9 | 1 | 108471 | Universiteti "Fan S. Noli" | A |
| 9 | 1 | 108472 | Universiteti "Ismail Qemali" | A |
| 9 | 1 | 108473 | Universiteti "Eqrem Çabej" | A |
| 9 | 1 | 108474 | Akademia e Edukimit Fizik dhe Sporteve "Vojo Kushi" | A |
| 9 | 1 | 108475 | Shkolla e larte "Universiteti Europian i Tiranës" | A |
| 9 | 1 | 110644 | Shkolla e larte "UNIVERSITETI POLIS" | A |
| 9 | 1 | 110645 | Shkolla e larte "AIdent" (me kohë të plotë) | A |
| 9 | 1 | 110647 | Shkolla e larte "Justiniani i Parë" | A |
| 9 | 1 | 110648 | | A |

FIG. 10

| Country ID | Level of Study ID | Degree Program ID | Degree Program Name | Degree Program Status |
|---|---|---|---|---|
| 9 | 1 | 4209 | Deftese Pjekurie | A |
| 9 | 2 | 4210 | Kandidat i Shkencave | A |
| 9 | 2 | 4211 | Titulli administrator biznesi | A |
| 9 | 2 | 4212 | Titulli agronom i larte | A |
| 9 | 2 | 4213 | Titulli arkitekt | A |
| 9 | 2 | 4214 | Titulli biolog | A |
| 9 | 2 | 4215 | Titulli farmacist | A |
| 9 | 2 | 4216 | Titulli fizikant | A |
| 9 | 2 | 4217 | Titulli inxhinier | A |
| 9 | 2 | 4218 | Titulli jurist | A |
| 15 | 2 | 1479 | Bachelor of Laws | A |
| 15 | 1 | 1480 | Higher School Certificate | A |
| 15 | 3 | 1486 | Associate Diploma of Engineering | A |
| 15 | 2 | 1494 | Bachelor of Optometry | A |
| 15 | 2 | 1495 | Bachelor of Pharmacy (Honours) | A |
| 15 | 2 | 1501 | Bachelor of Science | A |
| 15 | 2 | 1502 | Bachelor of Science (Honours) | A |
| 15 | 2 | 1514 | Doctor of Philosophy | A |
| 15 | 2 | 1515 | Juris Doctor | A |
| 15 | 2 | 1524 | Master of Applied Science | A |
| 15 | 2 | 1525 | Master of Arts | A |
| 15 | 2 | 1528 | Master of Business Administration | A |
| 15 | 2 | 1549 | Master of Engineering | A |

FIG. 11

| Country ID | Level of Study ID | Major ID | Major Name | Major Status |
|---|---|---|---|---|
| 9 | 1 | 12548 | Accounting | A |
| 9 | 2 | 21654 | Economics | A |
| 9 | 2 | 12477 | Advertising | A |
| 9 | 2 | 15788 | Civil Engineering | A |
| 9 | 2 | 14851 | Adult Education | A |
| 9 | 2 | 12358 | Accounting and Law | O |
| 9 | 2 | 4545 | Banking and Finance | A |
| 9 | 2 | 5487 | Biochemistry | A |
| 9 | 2 | 8987 | Food Engineering | A |
| 9 | 2 | 9445 | Foreign Language | A |
| 15 | 2 | 10454 | Cognitive Science | A |
| 15 | 1 | 24588 | Commerce | A |
| 15 | 3 | 4548 | Clinical Assistant | A |
| 15 | 2 | 12844 | Classical Studies | A |
| 15 | 2 | 7895 | Fashion Marketing | A |
| 15 | 2 | 6598 | Chemical Engineering | A |
| 15 | 2 | 8421 | Industrial Engineering | A |
| 15 | 2 | 8429 | Educational Technology | A |
| 15 | 2 | 9548 | English Education | A |
| 15 | 2 | 7999 | Engineering Science | A |
| 15 | 2 | 11108 | Geography | A |
| 15 | 2 | 11277 | Health Services Administration | A |
| 15 | 2 | 17568 | Human Resource Management | A |

FIG. 12

| Country ID | Level of Study ID | Level of Distinction ID | Level of Distinction Name | Level of Distinction Status |
|---|---|---|---|---|
| 2 | 2 | 1 | Division 1 | A |
| 2 | 2 | 2 | Division 2 | A |
| 2 | 2 | 3 | Division 3 | A |
| 121 | 2 | 1 | Division 1 | A |
| 121 | 2 | 2 | Division 2 | A |
| 121 | 2 | 3 | Division 3 | A |

FIG. 13

| Grading Scale ID | Grading Scale Name | Grading Scale Description | Country ID | Level Of Study ID | Institution ID | Degree Program ID | Major ID | Level of Distinction ID | Grading Scale Status | Applicant or Client Indicator | Grade Entry Type | Grade Range Min | Grade Range Max |
|---|---|---|---|---|---|---|---|---|---|---|---|---|---|
| 20000 | (1-4.4 = Fail) | | 62 | 2 | | | | | O | | T | 1 | 4.4 |
| 20001 | ECTS Scale | | 9 | 2 | | | 14851 | | A | | D | | |
| 20002 | Percent Scale: 0 - 100 | | 126 | 2 | | | | | A | | T | 0 | 100 |
| 20003 | Letter Scale 1 : A - F | | 131 | 2 | | | | | A | | D | | |
| 20004 | Numerical Scale: 0 - 10 | | 9 | 2 | | 4217 | | | A | | T | 0 | 10 |
| 20005 | Numerical Scale: 0 - 20 | | 10 | 2 | | | | | A | | T | 0 | 20 |
| 20006 | Numerical Scale: 0 - 20 | | 12 | 2 | | | | | A | | T | 0 | 20 |
| 20007 | Numerical Scale: 0 - 10 | | 14 | 2 | | | | | A | | T | 0 | 10 |
| 20008 | (2-5) | | 204 | 2 | | | | | O | | D | | |
| 20009 | Numerical Scale: 0 - 10 | | 182 | 2 | | 1502 | | | A | | T | 0 | 10 |
| 20010 | Descriptor Scale | | 15 | 2 | | | | | A | | D | | |
| 20011 | (5.9-1) | | 16 | 2 | | | | | O | | T | 1 | 5.9 |
| 20012 | 100 point | | 205 | 2 | | | | | O | | T | 0 | 100 |
| 20013 | Percent Scale: 0 - 100 | | 20 | 2 | | | | | A | | T | 0 | 100 |
| 20014 | Numerical Scale: 1 - 10 | | 194 | 2 | | | | | A | | T | 1 | 10 |
| 20015 | (0-20 = Fail) | | 22 | 2 | | | | | O | | T | 0 | 20 |
| 20016 | Letter Scale: A - F | | 23 | 2 | | | | | A | | D | | |
| 20017 | Numerical Scale: 0 - 20 | | 24 | 2 | | | | | A | | T | 0 | 20 |
| 20018 | Percent Scale: 0 - 100 | | 27 | 2 | | | | | A | | T | 0 | 100 |
| 20019 | Numerical Scale: 0 - 10 | | 191 | 2 | | | | | A | | T | 0 | 10 |
| 20020 | Percent Scale: 0 - 100 | | 28 | 2 | | | | | A | | T | 0 | 100 |
| 20021 | Numerical Scale: 0 - 10 | | 29 | 2 | | | | | A | | T | 0 | 10 |
| 20022 | Numerical Scale: 2 - 6 | | 32 | 2 | | | | | A | | T | 2 | 6 |
| 20023 | Numerical Scale: 0 - 20 | | 33 | 2 | | | | | A | | T | 0 | 20 |
| 20024 | Numerical Scale: 0 - 20 | | 37 | 2 | | | | | A | | T | 0 | 20 |
| 20025 | Numerical Scale: 0 - 20 | | 179 | 2 | | | | | A | | T | 0 | 20 |

| Grading Scale ID | Grading Scale Name | Grading Scale Status | Grade Status | Destination | Grade Start | Grade End | Grade Weight | Pass | Grade Weight Start | Grade Weight End | Sequence Number |
|---|---|---|---|---|---|---|---|---|---|---|---|
| 20006 | (0-20) | A | A | R | 15 | 20 | 4 | | 3.51 | 4 | 1 |
| 20006 | (0-20) | A | A | R | 12 | 14 | 3 | | 2.51 | 3.5 | 2 |
| 20006 | (0-20) | A | A | R | 10 | 11 | 2 | | 1.51 | 2.5 | 3 |
| 20006 | (0-20) | A | A | R | 0 | 9 | 0 | | 0 | 1.5 | 4 |
| 20007 | (0-10) | A | A | R | 10 | | 4 | | 3.51 | 4 | 1 |
| 20007 | (0-10) | A | A | R | 9 | 10 | 4 | | 3.51 | 4 | 2 |
| 20007 | (0-10) | A | A | R | 8 | | 3 | | 2.51 | 3.5 | 3 |
| 20007 | (0-10) | A | A | R | 7 | 8 | 3 | | 2.51 | 3.5 | 4 |
| 20007 | (0-10) | A | A | R | 6 | | 2 | | 1.51 | 2.5 | 5 |
| 20007 | (0-10) | A | A | R | 5 | 6 | 2 | | 1.51 | 2.5 | 6 |
| 20007 | (0-10) | A | A | | 4 | | 0 | | 0 | 0 | 7 |
| 20007 | (0-10) | A | A | | 3 | | 0 | | 0 | 0 | 8 |
| 20007 | (0-10) | A | A | | 2 | | 0 | | 0 | 0 | 9 |
| 20007 | (0-10) | A | A | | 1 | | 0 | | 0 | 0 | 10 |
| 20007 | (0-10) | A | A | R | 0 | 4 | 0 | | 0 | 1.5 | 12 |

FIG. 16

| Credit Scale ID | Credit Scale Name | Credit Scale Description | Country ID | Level Of Study ID | Institution ID | Degree Program ID | Major ID | Level of Distinction ID | Credit Scale Status | Applicant or Client Indicator | Credit Range Min | Credit Range Max |
|---|---|---|---|---|---|---|---|---|---|---|---|---|
| 20000 | Hour Scale | | 196 | 2 | | | | | O | | 0 | 2000 |
| 20001 | Education Scale (Albania) | | 9 | 2 | | | 14851 | 1 | A | | 0 | 1 |
| 20002 | Max - Min Scale | | 2 | 2 | | | | | A | | 35 | 100 |

| Credit Scale ID (1702) | Credit Scale Name (1704) | Credit Scale Status (1706) | Credit Use Indicator (1708) | Credit Status (1710) | Credit Start (1712) | Credit End (1714) | Credit Weight (1716) | Credit Weight Start (1718) | Credit Weight End (1720) |
|---|---|---|---|---|---|---|---|---|---|
| 20003 | Indian 90 Max Standard | A | D | A | 450 | | 15 | 14.51 | 15.5 |
| 20003 | Indian 90 Max Standard | A | D | A | 420 | | 14 | 13.51 | 14.5 |
| 20003 | Indian 90 Max Standard | A | D | A | 390 | | 13 | 12.51 | 13.5 |
| 20003 | Indian 90 Max Standard | A | D | A | 360 | | 12 | 11.51 | 12.5 |
| 20003 | Indian 90 Max Standard | A | D | A | 330 | | 11 | 10.51 | 11.5 |
| 20003 | Indian 90 Max Standard | A | D | A | 300 | | 10 | 9.51 | 10.5 |
| 20003 | Indian 90 Max Standard | A | D | A | 270 | | 9 | 8.51 | 9.5 |
| 20003 | Indian 90 Max Standard | A | D | A | 240 | | 8 | 7.51 | 8.5 |
| 20003 | Indian 90 Max Standard | A | D | A | 210 | | 7 | 6.51 | 7.5 |
| 20003 | Indian 90 Max Standard | A | D | A | 180 | | 6 | 5.51 | 6.5 |
| 20003 | Indian 90 Max Standard | A | D | A | 150 | | 5 | 4.51 | 5.5 |
| 20003 | Indian 90 Max Standard | A | D | A | 120 | | 4 | 3.51 | 4.5 |
| 20003 | Indian 90 Max Standard | A | D | A | 90 | | 3 | 2.51 | 3.5 |
| 20003 | Indian 90 Max Standard | A | D | A | 60 | | 2 | 1.51 | 2.5 |
| 20003 | Indian 90 Max Standard | A | D | A | 30 | | 1 | 0.76 | 1.5 |
| 20003 | Indian 90 Max Standard | A | D | A | 15 | | 0.5 | 0.26 | 0.75 |
| 20003 | Indian 90 Max Standard | A | D | A | 0 | | 0 | 0 | 0.25 |
| 20003 | Indian 90 Max Standard | A | H | A | 435.1 | 465 | 15 | 14.51 | 15.5 |
| 20003 | Indian 90 Max Standard | A | H | A | 405.1 | 435 | 14 | 13.51 | 14.5 |
| 20003 | Indian 90 Max Standard | A | H | A | 375.1 | 405 | 13 | 12.51 | 13.5 |
| 20003 | Indian 90 Max Standard | A | H | A | 345.1 | 375 | 12 | 11.51 | 12.5 |
| 20003 | Indian 90 Max Standard | A | H | A | 315.1 | 345 | 11 | 10.51 | 11.5 |
| 20003 | Indian 90 Max Standard | A | H | A | 285.1 | 315 | 10 | 9.51 | 10.5 |
| 20003 | Indian 90 Max Standard | A | H | A | 255.1 | 285 | 9 | 8.51 | 9.5 |
| 20003 | Indian 90 Max Standard | A | H | A | 225.1 | 255 | 8 | 7.51 | 8.5 |
| 20003 | Indian 90 Max Standard | A | H | A | 195.1 | 225 | 7 | 6.51 | 7.5 |
| 20003 | Indian 90 Max Standard | A | H | A | 165.1 | 195 | 6 | 5.51 | 6.5 |
| 20003 | Indian 90 Max Standard | A | H | A | 135.1 | 165 | 5 | 4.51 | 5.5 |
| 20003 | Indian 90 Max Standard | A | H | A | 105.1 | 135 | 4 | 3.51 | 4.5 |
| 20003 | Indian 90 Max Standard | A | H | A | 75.1 | 105 | 3 | 2.51 | 3.5 |
| 20003 | Indian 90 Max Standard | A | H | A | 45.1 | 75 | 2 | 1.51 | 2.5 |
| 20003 | Indian 90 Max Standard | A | H | A | 22.51 | 45 | 1 | 0.76 | 1.5 |
| 20003 | Indian 90 Max Standard | A | H | A | 7.6 | 22.5 | 0.5 | 0.26 | 0.75 |
| 20003 | Indian 90 Max Standard | A | H | A | 0 | 7.5 | 0 | 0 | 0.25 |

FIG. 17

| Temporary ID (1802) | Home Country ID (1804) | Home Level of Study ID (1806) | Home Institution ID (1808) | Home Degree Program ID (1810) | Home Major ID (1812) | Home Level of Distinction ID (1814) | Home Grading Scale ID (1816) | Home Credit Scale ID (1818) | Destination Country ID (1820) | Destination Grading Scale ID (1822) | Destination Credit Scale ID (1824) | Years of Study (1826) | Total Home Country Credits (1828) |
|---|---|---|---|---|---|---|---|---|---|---|---|---|---|
| 12869 | 125 | 2 | | | | | 20098 | 20154 | 42 | 1025 | 21182 | 5 | 1 |
| 12873 | 81 | 2 | | | | | 20063 | 21081 | 38 | 1257 | 21058 | 5 | 2240 |
| 12934 | 2 | 2 | 123032 | | | 1 | 20056 | 20101 | 38 | 1257 | 21058 | 5 | 3400 |
| 12979 | 140 | 2 | | | | | 20112 | 20084 | 6 | 1354 | 20187 | 5 | 25 |
| 13011 | 3 | 2 | | 2454 | 12775 | 3 | 20030 | 20014 | 62 | 1872 | 21054 | 5 | 226 |
| 13015 | 2 | 2 | | 5325 | 20054 | 1 | 20056 | 20101 | 1 | 1097 | 20095 | 4.5 | 6800 |
| 12879 | 2 | 2 | | | | | 20056 | 20101 | 192 | 1274 | 29541 | 4 | 6700 |
| 12885 | 79 | 2 | | 4565 | | | 20058 | 20101 | 38 | 1257 | 21058 | 4 | 128 |
| 12902 | 2 | 2 | | | | 2 | 20056 | 20101 | 15 | 1429 | 21077 | 4 | 8100 |
| 12935 | 16 | 2 | | | | | 20179 | 20784 | 38 | 1257 | 21058 | 4 | 211 |
| 12940 | 16 | 2 | | 2145 | | | 20179 | 20095 | 1 | 1018 | 20095 | 4 | 206 |
| 12941 | 79 | 2 | | | | | 20058 | 20095 | 1 | 1097 | 20095 | 4 | 139 |
| 12952 | 79 | 2 | | | | | 20058 | 20095 | 1 | 1097 | 20095 | 4 | 142 |
| 12931 | 6 | 2 | | | | | 20129 | 20782 | 15 | 1429 | 21954 | 3 | 186 |
| 12983 | 2 | 2 | 100234 | | | 1 | 20056 | 20101 | 121 | 1511 | 22586 | 3 | 1600 |
| 13001 | 2 | 2 | | 2754 | | 1 | 20056 | 20101 | 42 | 1025 | 23518 | 3 | 3000 |
| 12878 | 6 | 2 | | | | | 20129 | 20782 | 2 | 1227 | 24862 | 2 | 6 |
| 12955 | 38 | 2 | | | | | 20189 | 21058 | 1 | 1018 | 20095 | 2 | 5.5 |
| 12943 | 38 | 2 | | | | | 20189 | 21058 | 1 | 1018 | 20095 | 1.5 | 5.5 |
| 12881 | 42 | 2 | | | | | 20029 | 20457 | 1 | 1097 | 20095 | 1 | 14 |
| 12946 | 140 | 2 | | | | | 20112 | 21085 | 62 | 1872 | 21054 | 1 | 60 |

FIG. 18A

| Total Credit Weight | Total Credit Weight In GPA Calculation | GPA Weight | Destination GPA | Alternate GPA Name | Total Alternate Credit Weight | Total Alternate Credit Weight in GPA Calculation | Alternate GPA Weight | Alternate Destination GPA | Total Destination Credits | Total Alternate Destination Credits | Client ID | Student Name | Date Order |
|---|---|---|---|---|---|---|---|---|---|---|---|---|---|
| 150 | 150 | 3 | 75 - 84 | Major | 90 | 90 | 2.67 | 75 - 84 | 1500 | 700 | | Sample 1 | 1/25/2010 |
| 151.5 | 151.5 | 3.14 | B | Last 2 Years | 75 | 75 | 3.58 | B+ | 125 | 70 | | Sample 2 | 1/25/2010 |
| 148.5 | 145.5 | 3.49 | B+ | Engineering | 45 | 45 | 2.3 | C+ | 120 | 45 | | Applicant 1 | 1/25/2010 |
| 150 | 150 | 2.83 | 50 - 59 | | | | | | 150 | | | Test Applicant | 1/25/2010 |
| 146 | 146 | 3.52 | 2.6 - 3.5 | Transfer | 23 | 23 | 3.83 | 1.6 - 2.5 | 146 | 23 | | Test Sample | 1/25/2010 |
| 136 | 136 | 3.81 | A- | | | | | | 136 | | | Applicant 333 | 1/25/2010 |
| 133.5 | 133.5 | 3.85 | Ote Zhaksi (Very Good) | Science | 40 | 40 | 2.47 | Kanagat (Satisfactory) | 133.5 | 47 | | Test Applicant 2 | 1/25/2010 |
| 128 | 128 | 3.46 | B+ | | | | | | 128 | | | Applicant 3 | 1/25/2010 |
| 110.5 | 110.5 | 3.78 | Distinction | | | | | | 110.5 | | | Sample asam | 1/25/2010 |
| 124 | 124 | 3.77 | A- | | | | | | 124 | | | Testing Applicant | 1/25/2010 |
| 121 | 121 | 3.82 | 3.82 | | | | | | 120 | | | Sample sample | 1/25/2010 |
| 118 | 118 | 3.37 | 3.37 | Major | 72 | 72 | 3 | 3 | 118 | 62 | | Applicant 4 | 1/25/2010 |
| 120.5 | 120.5 | 3.38 | 3.38 | Science | 43 | 43 | 3.63 | 3.63 | 120.5 | 57 | | Test sample | 1/25/2010 |
| 73 | 54.5 | 2.45 | Pass | | | | | | 54.5 | | | Applicant 53 | 1/25/2010 |
| 88.5 | 88.5 | 3.09 | | | | | | | 1000 | | | Same test | 1/25/2010 |
| 90 | 90 | 3.93 | 85 - 100 | Arts | | | 4 | 85 - 100 | 95 | 87 | | Testing sample | 1/25/2010 |
| 60 | 60 | 3.44 | 55 - 59 | | | | | | 5900 | | | Applicant 16 | 1/25/2010 |
| 60 | 60 | 3.52 | 3.52 | | | | | | 60 | | | sample sample test | 1/25/2010 |
| 44 | 44 | 3.52 | 3.52 | | | | | | 44 | | | Applicant 56 | 1/25/2010 |
| 28 | 28 | 4 | 4 | | | | | | 28 | | | Test 123 | 1/25/2010 |
| 30 | 30 | 3.89 | | Major | 24 | 24 | 3.71 | 1.6 - 2.5 | 140 | 27 | | Applicant 67 | 1/25/2010 |

FIG. 18B

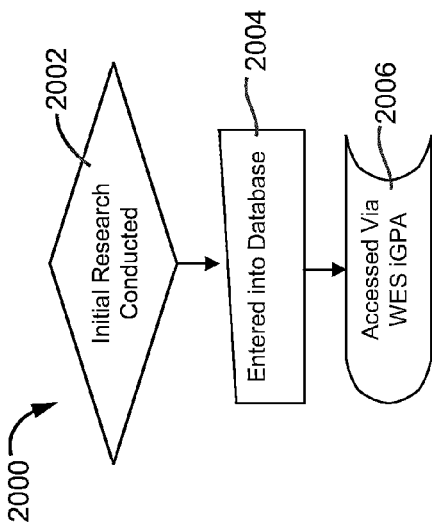

US 9,177,078 B1

SYSTEMS AND METHODS FOR ANALYSIS OF INTERNATIONAL EDUCATION CREDENTIAL EQUIVALENCE

CROSS-REFERENCE TO RELATED PATENT APPLICATIONS

This application claims priority from Provisional Application U.S. Application 61/155,483, filed Feb. 25, 2009, incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present disclosure relates generally to the field of analyzing international educational credential equivalence. More specifically, the disclosure relates to computer-based systems and methods for converting educational credentials from values assigned in an originating country to corresponding values for a destination country.

Conventional grade point average (GPA) calculators and converters only convert numeric scores from foreign countries into letter scores for the United States. Therefore, the actual weight of the numeric score is lost and a more generic score with wider banding results. These conventional methods of converting scholastic grades also do not take into account specific courses, credits, and grades designated by the user.

What is needed is a system and method for converting scores (whether they be numeric, letter or descriptive) from a first country into a numeric weight and further converting such numeric weight to the scores (whether they be numeric, letter or descriptive) of a second country. What is also needed is a system and method for calculating a GPA based on an actual numeric weight of the original score. What is also needed is a system and method for calculating a more specific GPA with a narrower band of results. What is further needed is a system and method for converting scholastic grades that accounts for specific courses, credits, and grades designated by a user.

SUMMARY

One exemplary embodiment relates to a system for converting educational credentials from a first country to credentials for a second country. The system includes a database configured to store data related to at least one of grading scales, credit scales, course descriptions, rankings, and weighting for educational credentials and a processor configured to receive data from a user related to course grades and credits earned in the first country and a selection of the second country. The processor retrieves data from the database based on the user data and converting the course grades and credits earned in the first country to grades, credits, and grade point averages for use in the second country based on the data from the database. The processor provides the grades, credits, and grade point averages equivalent in the second country to an electronic display for display to the user.

Another exemplary embodiment relates to a method for converting educational credentials from a first country to credentials for a second country. The method includes receiving first data from a user at a processor. The first data is related to course grades and credits earned in the first country and a selection of the second country. The method also includes retrieving second data from a database using the processor based on the first data. The second data is related to at least one of grading scales, credit scales, course descriptions, rankings, and weighting for educational credentials in an electronic database. The system also includes converting the course grades and credits earned in the first country to grades, credits, and grade point averages for use in the second country based on the second data using the processor and providing the grades, credits, and grade point average equivalent in the second country to an electronic display from the processor for display to the user.

Another exemplary embodiment relates to a system for converting educational credentials from a first country to credentials for a second country. The system includes means for receiving first data from a user. The first data is related to course grades and credits earned in the first country and a selection of the second country. The system also includes means for retrieving second data from a database based on the first data. The second data is related to at least one of grading scales, credit scales, course descriptions, rankings, and weighting for educational credentials. The system also includes means for converting the course grades and credits earned in the first country to grades, credits, and grade point average for use in the second country based on the second data and means for providing the numeric grades, credits, and grade point average equivalent in the second country to the user.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a block diagram illustrating a system for analyzing international educational credential equivalence, according to an exemplary embodiment;

FIG. 2 is a screenshot of a dialog box for entering country of education, destination country, and level of study information, according to an exemplary embodiment;

FIG. 3 is a screenshot of a dialog box for searching of educational institutions, according to an exemplary embodiment;

FIG. 4 is a screenshot displaying search results from the webpage for searching for educational institutions in FIG. 3, according to an exemplary embodiment;

FIG. 6 is a screenshot of a dialog box for inputting course information, according to an exemplary embodiment;

FIG. 7 is a screenshot of the results of a GPA calculation, according to an exemplary embodiment;

FIG. 10 is a table of names and IDs of institutions, according to an exemplary embodiment;

FIG. 11 is a table of names and IDs of degree programs, according to an exemplary embodiment;

FIG. 12 is a table of names and IDs of majors, according to an exemplary embodiment;

FIG. 13 is a table of names and IDs of levels of distinction, according to an exemplary embodiment;

FIG. 14 is a table of country grading scales for converting scholastic grades, according to an exemplary embodiment;

FIG. 15 is a table of grading scale conversions, according to an exemplary embodiment;

FIG. 16 is a table of country credit scales for converting scholastic credits, according to an exemplary embodiment;

FIG. 17 is a table of credit scale conversions, according to an exemplary embodiment;

FIGS. 18A and 18B are tables of applicant information, according to an exemplary embodiment;

FIG. 19 is a table of course data input by a user and calculated by the system, according to an exemplary embodiment;

FIG. 20 is a flowchart illustrating a method for data extraction, according to an exemplary embodiment.

DETAILED DESCRIPTION

Figure 5:
FIG. 5 is a screenshot of a dialog box for selecting degree program, major, level of distinction, grading scale, and years of study and for requesting an alternate GPA, according to an exemplary embodiment.

Referring to FIG. 1, according to various exemplary embodiments, a web- or client-based system 100 is configured to convert educational credential data from a sending or originating country (the country in which the credential in question was issued) to a destination country. System 100 generally includes a server 102 configured to execute program code for the conversion or calculation based on data retrieved from a database 104 and user commands received from a remote computer system 106.

In one exemplary embodiment, a user (e.g., a client institution or an individual student) can enter course titles (optional), at least one course credit, and at least one grade from a sending country on computer system 106. Computer System 106 transmits the input data via a network (e.g., a local area network, the Internet, a wireless network, etc.) to server 102. Server 102 then converts at least one course's grade and credits and calculates a subsequent grade point average (GPA) for at least one destination country. As the user inputs individual course titles, credits, and grades from the sending country, server 102 determines corresponding numeric, letter, or descriptive grades in the grading system of at least one destination country as well as the corresponding credits in the credit system of at least one destination country.

Each grade in the grading system used in the sending country has a pre-assigned numerical grade weight stored in database 104 and each credit used in the sending country has a pre-assigned credit weight stored in database 104. Server 102 converts each course's grade and credits in the sending country using the corresponding numerical grade weight and credit weight from database 104 and then converts the weighted grade to a pre-assigned grade in the destination country and converts the weighted credits to pre-assigned credits in the destination country. The numerical grade and credit weights for various countries may be stored in tables on database 104. Server 102 calculates the GPA for a designated country by averaging the numerical grade weights assigned to the sending country grades and converting the average grade weight to a GPA grade in the destination country. Server 102 may also calculate the total number of credits and an alternate grade point average for the set destination country as well as a total of the alternate course credits (e.g., total credits of major courses).

According to some exemplary embodiments, server 102 includes a processor 108 configured to execute the conversion program code. Server 102 may also include a memory 110 configured to store the program code, website data (e.g., html code) for accessing the system, received user commands, user and payment information, data received from database 104, and/or data results of the conversion. Server 102 may also include a communication module 112 configured to facilitate communication with database 104 and computer system 106. Database 104 is configured to store conversion data as described above and may also be configured to store conversion results, user information, and payment information. Periodically, server 102 may be configured to update database 104 with conversion results, user information, and payment information for backup.

According to some exemplary embodiments, computer system 106 includes a processor 114 configured to execute program code for using and displaying data from server 102 and for receiving data from a user. Computer system 106 may also include a memory 116 configured to store this program code, received user commands, and/or data received from server 102. Computer system 106 may also include a communication module 118 configured to facilitate communication with server 102.

According to various exemplary embodiments, server 102 may be a SQL server or any other server capable of executing academic credential conversion or calculation program code. According to various exemplary embodiments, database 104 may be an Oracle database or any other database capable of being accessed by server 102 and capable of storing academic credential data. While database 104 is illustrated as being remote from server 102 (e.g., on a separate server), according to other exemplary embodiments, database 104 may be located on server 102. According to various exemplary embodiments, computer system 106 may be a laptop computer, a desktop computer, a computer workstation, a cellular phone, a smart phone, a personal digital assistant, or any other computing device capable of communicating with server 102.

According to other exemplary embodiments, the academic credential conversion or calculation program code may be installed locally on or executed locally by computer system 106. According to still other exemplary embodiments, database 104 may be located or stored locally on computer system 106. While academic credential conversion or calculation is generally discussed herein as program code, according to other exemplary embodiments, the conversion and calculation functionality may be hardwired on server 102 or computer system 106. Similarly, the data stored in database 104 may be hardwired in server 102 or computer system 106.

Various exemplary embodiments may be implemented by clients/institutions or by individual student users. The data input may vary depending on the intended use, but the exemplary embodiments herein describe data input generic to all users. The following screen shots illustrate an exemplary web-based user interface. Additional screenshots and description related to client login, client registration, and client/applicant payment are not shown, but may be present in system 100. It is also noted that the illustrated screenshots may be varied for different clients, applicants, and user preferences.

Referring to FIG. 2, a screenshot (e.g., from a webpage, from a local client program, etc.) illustrates a dialog box 200 of a calculator page configured for receiving information from a user (e.g., a student or client) that is related to country of education, destination country, level of study, and optionally a student name, according to an exemplary embodiment.

Dialog box 200 includes a link or button 202 to the calculator page (shown in FIGS. 2-7), a link or button 204 to a history page configured to illustrate previous conversions or calculations, a link or button 206 to an administrator page, and a link or button 208 configured to allow the user to logout of their account. Dialog box 200 also includes a text box 210 where a user can optionally enter a student's name, a dropdown box 212 for listing possible countries of education or sending countries (e.g., approximately 215 countries that are stored in a country name table on database 104), a dropdown box 214 for listing possible destination countries (e.g., approximately 215 countries stored in the country name table of database 104), a dropdown box 216 for listing levels of study (e.g., "Secondary", "Post-Secondary", etc.) that are applicable to the country of education (levels of study may be stored in a level of study name table in database 104), and a command button 218 configured to proceed to an institution search. Command button 218 may be a conditional field and only appear when there are grading or credit scales for the country of education in a grading scale or credit scale name table in database 104 that is specific to the level of study as well as to the institution.

Referring to FIG. 3, a screenshot illustrates a dialog box 300 of the calculator page configured for searching of educational institutions, according to an exemplary embodiment. Dialog box 300 allows clients and student applicants to search for an institution in the country of education. Similar to dialog box 200, dialog box 300 includes links or buttons 202, 204, 206, and 208. Dialog box 300 also includes a text box 302 configured to allow the user to enter the name or a word that is part of the name of an institution to locate a specific institution in the country of education and at the selected level of study. Institutions are stored in an institution name table of database 104. Dialog box 300 also includes a command button 304 configured to execute the institution search and a command button 306 configured to return the user to dialog box 200 for selection of country of education, country of destination, and level of study.

Referring to FIG. 4, a screenshot illustrates a dialog box 400 of the calculator page configured to display search results from the educational institution search of dialog box 300, according to an exemplary embodiment. Dialog box 400 is configured to allow ordering clients and student applicants to select an appropriate institution in the country of education. Similar to dialog box 200, dialog box 400 includes links or buttons 202, 204, 206, and 208. Dialog box 400 also includes option or radio buttons 402 that allow the user to select a particular institution in the country of education that was found in the institution search. Dialog box 400 also includes a command button 404 for confirming the selection of a particular institution in the country of education and for progressing the user to a screen for selecting degree program, major, level of distinction, grading scale, number of years of study, and an alternate or second GPA name. Dialog box 400 further includes a command button 406 to return the user to dialog box 200 for selection of country of education, country of destination, and level of study. Dialog box 400 further includes a command button 408 that returns the user to dialog box 300 to search for additional or other institutions in the sending country.

Referring to FIG. 5, a screenshot illustrates a dialog box 500 of the calculator page for selecting degree program, major, level of distinction, grading scale, and years of study and for requesting and naming an alternate or second GPA, according to an exemplary embodiment. Dialog box 500 allows ordering clients and student applicants to select the degree program, major, and level of distinction. These fields are conditional and will only appear when there are grading or credit scales for the home country in the grading scale or credit scale name tables in database 104 that are specific to the level of study as well as to the field in question (e.g., "degree program," "major," "level of distinction," etc.). Dialog box 500 also allows ordering clients and student applicants to select the grading scale and the number of years of full-time study and enter a name for an alternate or second GPA.

Similar to dialog box 200, dialog box 500 includes links or buttons 202, 204, 206, and 208. Dialog box 500 also includes an optional text box 502 configured to allow entry of the student applicant's name, which may be preset from entry in dialog box 200. Dialog box 500 also includes a dropdown box 504 (e.g., listing approximately 215 countries) for the country of education, a dropdown box 506 (e.g., listing approximately 215 countries) for the destination country, and a dropdown box 508 for selecting the level of study in the home country of education. Boxes 504, 506, and 508 may be initially preset to the countries and level of study selected in dialog box 200.

The following fields (and button) are conditional and only appear when there are grading or credit scales for the home country in grading scale or credit scale name tables of database 104 that are specific to the level of study as well as the field in question (e.g., "degree program," "major," "level of distinction," etc.). Dialog box 500 further includes a name field 510 that provides the name of the institution selected from the institution search, a dropdown box 512 listing degree programs in the country of education for the particular level of study selected (degree program names are stored in a degree program name table in database 104), and a dropdown box 514 listing majors in the country of education for the particular level of education selected (major names are stored in a major name table in database 104). Further still, dialog box 500 includes a command button 516 to delete the selected institution name and return the user to dialog box 300 to search for another institution in the sending country of education. While not shown, dialog box 500 may also include a dropdown box listing levels of distinction in the country of education for the particular level of study selected (level of distinction names are stored in a level of distinction name table in database 104).

Dialog box 500 further includes a dropdown box 518 conditionally appearing when there is a choice of more than one grading scale that meets the selected criteria of country of education, level of study, and (when appropriate) institution, degree program, major and/or level of distinction. Dropdown box 518 provides the available choices of grading scales from which the user can choose. Grading scale choice names are stored in a grading scale description field in a grading name table in database 104.

Further still, dialog box 500 includes a dropdown box 520 allowing the user to select the number of years of full-time study in increments of 0.5 years, an optional text box 522 allowing the user to request an alternate or second GPA and enter a name for the alternate GPA (used as a field heading title in FIGS. 6 and 7), and a command button 524 to confirm the above-mentioned entries and proceed the user to the next step for entering course titles, credits, and grades.

In some exemplary embodiments there may be options to enter destination institution, destination degree program, and/or destination major for searching for specific destination grading or credit scales to help users compute transfer credit. In some exemplary embodiments, users may also have the option to enter user-defined grading or credit scales. For example, an institution using the presently described international GPA calculator has its own particular grading or credit scale, can enter the scale(s), and subsequently can use the scales(s) for converting grades and credits and for calculating GPAs.

Figure 6:
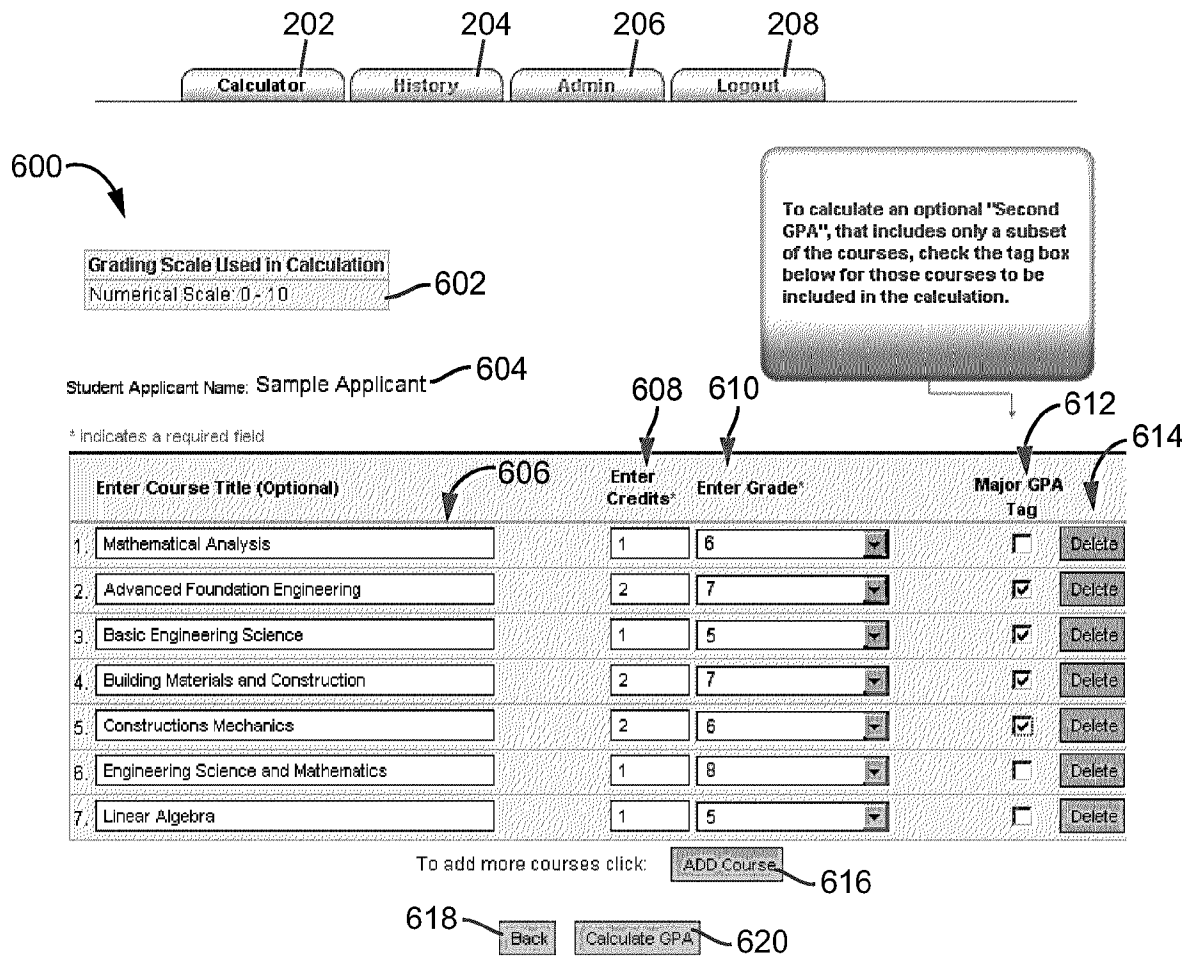

Referring to FIG. 6, a screenshot of a dialog box 600 of the calculator page is configured for receiving course information from the user, according to an exemplary embodiment. Dialog box 600 allows ordering clients and student applicants to enter course titles, credits, and grades for calculating destination grades, credits, and GPA, and to designate courses for the calculation of an alternate or second GPA.

Similar to dialog box 200, dialog box 600 includes links or buttons 202, 204, 206, and 208. Dialog box 600 also includes a description 602 of the grading scale to be used (taken from the grading scale description field in the grading scale name table of database 104), an optional label 604 indicating the name of a student applicant, at least one text box 606 configured to allow entry of a course title, and a text box 608 configured to allow entry of numeric credits (maximum marks for certain credit scales). If a credit scale is available, the credits entered have to fall within the values set in credit range minimum and credit range maximum fields in the credit scale name table of database 104 for the selected Credit Scale.

Dialog box 600 also includes a dropdown box 610 (may be a text box for certain grading scales) configured to allow the selection of grades (or "marks obtained" for certain grading scales). The dropdown choices are stored in a grading scale detail table of database 104. For text-box entries, grades entered have to fall within the values set in grade range minimum and grade range maximum fields in the grading scale name table of database 104. While not illustrated, dialog box 600 may include a text box configured to allow entry of the minimum numeric credits for passing a course (may only appear for certain grading scales).

Dialog box 600 further includes a check box 612 for each entered course that can be checked to include the course in the calculation of an alternate or second GPA. The name entered in Dialog box 500 for the alternate GPA is used as a heading for the checkbox column. Further still, dialog box 600 includes a command button 614 for each course to delete or remove a row of course information, a command button 616 to add a row of course information, a command button 618 to return the user to dialog box 500, and a command button 620 to calculate the destination grades, credits, and GPA and to progress the user to the next step to view results.

Referring to FIG. 7, a screenshot illustrates a dialog box 700 providing results of a GPA calculation, according to an exemplary embodiment. Dialog box 700 allows ordering clients and student applicants to view and print the results of the calculation process. Similar to dialog box 200, dialog box 700 includes links or buttons 202, 204, 206, and 208. Dialog box 700 also includes a label 702 listing the home country of education, a label 704 listing the destination country, an optional label 706 indicating the name of a student applicant, a printer icon 708 can be clicked to print the results, and a summary 710 of entries from dialog box 600.

Dialog box 700 further includes results 712 of destination credits from the credit calculation process for each course. In some cases the destination credits may be presented as a range. Column 712 may be labeled by the destination country name, for example, "U.S. Credits" if the destination country is the United States. Dialog box 700 further includes results 714 of destination grade from the grade calculation process for each course. In some cases the destination grade may be presented as a range. Column 714 may be labeled by the destination country name, for example, "U.S. Grade" if the destination country is the United States. In some exemplary embodiments, a second destination grade may be displayed, for example, a grade of "3" on a "0-4" scale in addition to a grade of "B" on an "A to F" scale.

Further still, dialog box 700 includes a total 716 of the destination credits (the label may include the destination country name), a total 718 of the alternate or second GPA credits (the label may include the alternate GPA name, for example, "Total Major Credits"), a result 720 of total GPA from the calculation process (the label may include the destination country name), and a result 722 of the alternate GPA from the calculation process (the label may include the alternate GPA name). In some exemplary embodiments, a additional alternate GPAs may be indicated. The columns of these additional alternate GPAs may be labeled by the additional alternate GPA names, for example, "Last-2 Years GPA" in addition to "Major GPA". Dialog box 700 also includes a command button 724 used to start over or return the user to dialog box 200 to select the country of education.

Figure 8:
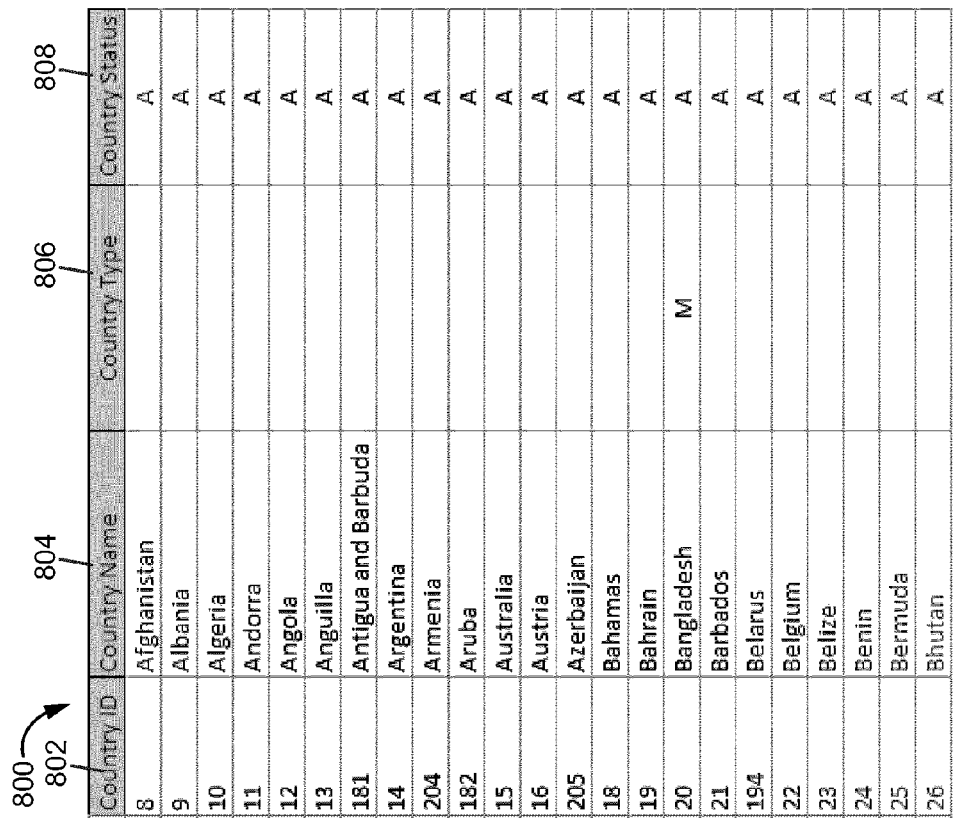
FIG. 8 is a table of names and IDs of countries, according to an exemplary embodiment.

Referring to FIG. 8, a country name table 800 stored in database 104 is used to specify the name and ID of countries in a grading scale name table, a credit scale name table, a level of study name table, an institution name table, a degree program name table, a major name table, and a level of distinction name table and is used for dropdown country choices in dialog boxes 200 and 500, according to an exemplary embodiment. Table 800 includes a country ID field 802 storing a numeric identifier of the country, a country name field 804 storing a name of the country, and a country type field 806 storing a type of country. For example, "M" indicates that the country (e.g., India, Bangladesh, Pakistan, Burma, Nepal) uses "Maximum Marks" and some calculations and presentations are different from other countries, "U" indicates that the country (e.g., the U.S.) as a destination country has a GPA presented as 0-4 grade weights rather converted into its grading scale (A-F). Table 800 further includes a country status field 808 that indicates if the country is valid (e.g. '0' may be used for obsolete and 'A' may be used for active).

Figure 9:
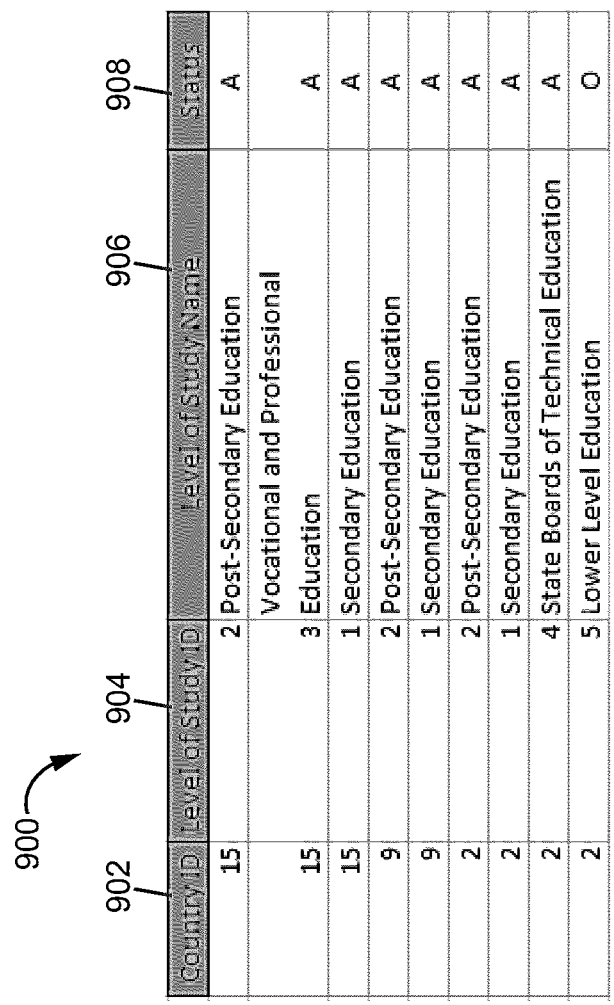
FIG. 9 is a table of names and IDs of levels of study, according to an exemplary embodiment.

Referring to FIG. 9, a level of study name table 900 stored in database 104 is used to specify the name and ID of levels of study in the grading scale name table, the credit scale name table, the institution name table, the degree program name table, the major name table, and the level of distinction name table and is used for dropdown level of study choices in dialog boxes 200 and 500, according to an exemplary embodiment. Table 900 includes a country ID field 902 storing a numeric identifier of the country of the level of study, a level of study ID field 904 storing a numeric identifier of the level of study, a level of study name field 906 storing the name of the level of study, and a level of study status field 908 indicating if the level of study is valid (e.g., '0' is used for obsolete and 'A' is for active).

Referring to FIG. 10, an institution name table 1000 stored in database 104 is used to specify a name and ID of institutions in the grading scale name table and the credit scale name table and is used for institution searches in dialog boxes 300 and 400, according to an exemplary embodiment. Table 1000 includes a country ID field 1002 storing a numeric identifier of the country of the institution, a level of study ID field 1004 storing a numeric identifier of the level of study of the institution, an institution ID field 1006 storing a numeric identifier of the institution, an institution name field 1008 storing the name of the institution, and an institution status field 1010 indicating if the institution is valid.

Referring to FIG. 11, degree program name table 1100 stored in database 104 is used to specify the name and ID of degree programs in the grading scale name table and the credit scale name table and is used for dropdown degree program choices in dialog box 500, according to an exemplary embodiment. Table 1100 includes a country ID field 1102 storing a numeric identifier of the country of the degree program, a level of study ID field 1104 storing a numeric identifier of the level of study of the degree program, a degree program ID field 1106 storing a numeric identifier of the degree program, a degree program name field 1108 storing the name of the degree program, and a degree program status field 1110 indicating if the degree program is valid.

Referring to FIG. 12, a major name table 1200 stored in database 104 is used to specify the name and ID of majors in the grading scale name table and the credit scale name table and is used for dropdown major choices in dialog box 500, according to an exemplary embodiment. Table 1200 includes a country ID field 1202 storing a numeric identifier of the country of the major, a level of study ID field 1204 storing a numeric identifier of the level of study of the major, a major ID field 1206 storing a numeric identifier of the major, a major name field 1208 storing the name of the major, and a major status field 1210 indicating if the major is valid.

Referring to FIG. 13, a level of distinction name table 1300 stored in database 104 is used to specify the name and ID of levels of distinction in the grading scale name table and the credit scale name table and is used for dropdown level of distinction choices in dialog box 500 (not shown), according to an exemplary embodiment. Table 1300 includes a country ID field 1302 storing a numeric identifier of the country of the level of distinction, a level of study ID field 1304 storing a numeric identifier of the level of study of the level of distinction, a level of distinction ID field 1306 storing a numeric identifier of the level of distinction, a level of distinction name field 1308 storing the name of the level of distinction, and a level of distinction status field 1310 indicating if the level of distinction is valid.

Referring to FIG. 14, a grading scale name table 1400 stored in database 104 is used to specify the grading scale(s) available for selection based on the country selected by the user as well as level of study, institution, degree program, major, and/or level of distinction, according to an exemplary embodiment. Table 1400 includes a grading scale ID field 1402 storing a numeric identifier of the grading scale, a grading scale name field 1404 storing the name of the grading scale, a grading scale description field 1406 is an additional note field used to describe the grading scale (e.g., for grading scale name translation purposes), a country ID field 1408 storing a numeric identifier of the country ID that the grading scale is linked to, a level of study ID field 1410 storing a numeric identifier of the level of study ID that the grading scale is linked to, an institution ID field 1412 storing a numeric identifier of the institution ID (if any) that the grading scale is linked to, a degree program ID field 1414 storing a numeric identifier of the degree program ID (if any) that the grading scale is linked to, a major ID field 1416 storing a numeric identifier of the major ID (if any) that the grading scale is linked to, a level of distinction ID field 1418 storing a numeric identifier of the level of distinction ID (if any) that the grading scale is linked to, a grading scale status field 1420 that indicates if the grading scale is valid, an applicant or client indicator field 1422 that indicates if the grading scale is intended for use by applicants or clients (in general) or for a specific client, a grade entry type field 1424 that indicates if course grades are entered via a dropdown list or via a text box (e.g., "D" is used to indicate that a dropdown is used, "T" is used to indicate that a text box is used), a grade range min field 1426 for grading scales using textbox entered grades and that stores the minimum grade possible for entry for a course, and a grade range max field 1428 for grading scales using textbox entered grades and that stores the maximum grade possible for entry for a course.

Referring to FIG. 15, a grading scale detail table 1500 stored in database 104 is used to list the grading scale and grades used in the home or destination country, convert home country grades into corresponding grade weights, and convert grade weights into destination country grades, according to an exemplary embodiment. Table 1500 includes a grading scale ID field 1502 storing a numeric indicator of the grading scale, a grading scale name field 1504 storing the name of the grading scale, a grading scale status field 1506 indicating if the grading scale is valid, a grade status field 1508 indicating if the grade is valid, and a destination field 1510 indicating whether the table record is to be included for possible grade weight conversion to a destination grade.

For example, an "M" may be used to indicate that a grade start field is to be used for the destination grade (for certain countries that use "Marks") and to exclude the grades from inclusion in home grade entry. An "S" may be used to indicate that only the value of a grade start field is to be used for the destination grade. An "R" may be used to indicate that both a grade start field and a grade end field are to be used to set a destination grade range. A blank may be used to indicate that the table record is not to be used to set a destination grade or grade range.

Table 1500 also includes a grade start field 1512 storing the home and/or destination country grade (for a range of grades, the start of the grade range), a grade end field 1514 storing the end of the home country and/or destination grade range, a grade weight field 1516 storing the weight of the country grade on a 0-4 scale, a pass field 1518 indicating if the grade is the equivalent of "Pass" in a course taken on a pass/fail basis (such courses may be included in the total credits, but not used in the GPA calculation), a grade weight start field 1520 storing the weight of the country grade on a 0-4 scale (for a range of grade weights, the start of the grade weight range) and used for determining destination grades, a grade weight end field 1522 storing the weight of the country grade on a 0-4 scale (for a range of grade weights, the end of the grade weight range) and used for determining destination grades, and a sequence number field 1524 storing a sequence number indicating a sequence of grades within a grading scale.

Referring to FIG. 16, a credit scale name table 1600 stored in database 104 is used to specify the credit scale(s) available for selection based on the country selected by the user as well as level of study, institution, degree program, major and/or level of distinction, according to an exemplary embodiment. Table 1600 includes a credit scale ID field 1602 storing a numeric identifier of the credit scale, a credit scale name field 1604 storing the name of the credit scale, a credit scale description field 1606 storing an additional note field to describe the credit scale (e.g., for credit scale name translation purposes), a country ID 1608 storing the country ID that the credit scale is linked to, a level of study ID field 1610 storing the level of study ID that the credit scale is linked to, an institution ID field 1612 storing the institution ID (if any) that the credit scale is linked to, a degree program ID field 1614 storing the degree program ID (if any) that the credit scale is linked to, a major ID field 1616 storing the major ID (if any) that the credit scale is linked to, a level of distinction ID field 1618 storing the level of distinction ID (if any) that the credit scale is linked to, a credit scale status field 1620 indicating if the credit scale is valid, an applicant or client indicator field 1622 indicating if the credit scale is intended for use by applicants or clients (in general) or for a specific client, a credit range min field 1624 storing the minimum credit possible for entry for a course, and a credit range max field 1626 storing the maximum credit possible for entry for a course.

Referring to FIG. 17, a credit scale detail table 1700 stored in database 104 is used to list the credit scale used in the home or destination country and convert home country credits into corresponding credit weights and convert credit weights into destination country credits, according to an exemplary embodiment. Table 1700 includes a credit scale ID field 1702 storing a numeric identifier of the credit scale, a credit scale name field 1704 indicating the name of the credit scale, a credit scale status field 1706 indicating if the credit scale is valid, a credit use indicator field 1708 that indicates how the credits are to be used (e.g., designations for certain countries that use "Marks": "D" indicates that the record is to be used only for destination credit designation; "H" indicates that the record is to be used only for home credit entry), a credit status field 1710 that indicates if the credit entry in the table is valid, a credit start field 1712 storing the country credits or for a range of credits the start of the country credit range, a credit end field 1714 storing the country credits or for a range of credits the end of the country credit range, a credit weight field 1716 storing the weight of the country credits, a credit weight start field 1718 indicating a weight of country credits (for a range of credits, the start of the credit weight range) used for determining destination country credits, and a credit weight end field 1720 storing a weight of country credits (for a range of credits, the end of the credit weight range) used for determining destination country credits.

Referring to FIGS. 18A and 18B an applicant summary table 1800 stored in database 104 is used to store the non-course-specific data that is entered or selected by the user as well as resulting calculations, according to an exemplary embodiment. Table 1800 includes a temporary ID field 1802 storing a unique numeric identifier assigned to each user submission, a home country ID field 1804 storing the country ID of the country of education, a home level of study ID field 1806 that indicates the level of study ID of the country of education linked to the grading scale and/or the credit scale, a home institution ID field 1808 that indicates the institution ID of the country of education institution linked to the grading scale and/or the credit scale, a home degree program ID field 1810 that indicates the degree program ID of the country of education degree program linked to the grading scale and/or the credit scale, a home major ID field 1812 that indicates the major ID of the country of education major linked to the grading scale and/or the credit scale, a home level of distinction ID field 1814 that indicates the level of distinction ID of the country of education linked to the grading scale and/or the credit scale, a home grading scale ID field 1816 storing the ID of the grading scale selected for the home grades, a home credit scale ID field 1818 storing the ID of the credit scale selected for the home credits, a destination country ID field 1820 storing the destination country ID, a destination grading scale ID field 1822 storing the ID of the grading scale selected for the destination grades, a destination credit scale ID field 1824 storing the ID of the credit scale selected for the destination credits, a years of study field 1826 storing the number of years of full-time study entered by the user, and a total home country credits field 1828 storing the total number of home country credits.

Table 1800 also includes a total credit weight field 1830 storing the total of the credit weights assigned to all courses, a total credit weight in GPA calculation field 1832 storing the total of the credit weights used in the GPA calculation (the credits provided for a "Pass" grade are not included in the GPA calculation), a GPA weight field 1834 storing the GPA after calculation (excludes credits provided for a "Pass" grade), a destination GPA field 1836 storing the equivalent grade in the destination country of the GPA weight, an alternate GPA name 1838 storing the name assigned for the alternate GPA (in other exemplary embodiments, more than one alternate GPA may be used, for example, major GPA and last 2 years of study GPA), a total alternate credit weight field 1840 storing the total of the credit weights assigned to all courses of a set of selected courses, a total alternate credit weight in GPA calculation field 1842 storing the total of the credit weights used in the alternate GPA calculation (the credits provided for a "Pass" grade are not included in the GPA calculation), an alternate GPA weight field 1844 storing the alternate GPA after calculation (excludes credits provided for a "Pass" grade), an alternate destination GPA field 1846 storing the equivalent grade in the destination country of the alternate GPA weight, a total destination credits field 1848 storing the total of the destination credits of all courses, a total alternate destination credits field 1850 storing the total of the alternate destination credits of a set of selected courses, a client ID field 1852 indicating a numerical identifier of the client if the client is registered for the GPA Calculation System, a student name field 1854 storing the name of the student applicant, and a date order field 1856 storing the date of the GPA calculation order.

Referring to FIG. 19, a course table 1900 stored in database 104 is used to store the course data that is entered by the user, according to an exemplary embodiment. Table 1900 includes a temporary ID field 1902 storing a unique numeric identifier assigned to each user submission, a course ID field 1904 storing a numeric identifier assigned to each course in each submission to system 100, a course name field 1906 storing the title of a course, a home country credits field 1908 storing the number of home country credits for each course, a credit weight field 1910 storing the credit weight for each course, a destination credit start field 1912 storing the destination country credit (for a range of credits, the start of the destination country credit range), a destination credit end field 1914 storing the destination country credit (for a range of credits, the end of the destination country credit range), a home country grade field 1916 storing course grade or marks in the home country, a minimum marks field 1918 storing the minimum passing marks for a particular course for certain countries (e.g., India, Bangladesh, Pakistan, Burma, and Nepal), a grade weight field 1920 storing the grade weight for each course (for a "Pass" in a course taken pass/fail, the field is left blank), a pass field 1922 storing an indicator signifying the equivalent of a "Pass" in a course taken on a pass/fail basis (such courses will be included in the total credits, but not used in the GPA calculation), a destination grade start field 1924 storing the destination country grade (for a range of grades, the start of the destination country grade range), a destination grade end field 1926 storing the destination country grade (for a range of grades, the end of the destination country grade range), and an alternate GPA indicator field 1928 that indicates if the course is included in the alternate GPA calculation.

Referring to FIG. 20, a method 2000 for data extraction in system 100 is illustrated according to an exemplary embodiment. Initial research is performed to collect data concerning grading scales, credit scales, course descriptions, rankings, weighting and other information needed to convert scholastic grades from one standard to another. Once the data is compiled, the information is input into a database. The collection and inputting may be an iterative process, may be an ongoing and evolving process, or may require updating. As such, the data extraction takes information from multiple data sources and creates a database from which one can convert or adjust and correlate scholastic grades. Furthermore because such information may continually be changed or be updated, the flow shown is not intended to be a limitation on the embodiments of the present invention, whether one type of event occurs first or whether the events tend to occur at the same time or whether the order is random.

At a step 2002, country of education data, country-specific grading and credit scale data, level-of-study name data, level-of-study-specific grading and credit scale data, institution name data, institution-specific grading and credit scale data, degree program name data, degree-program-specific grading and credit scale data, major name data, major-specific grading and credit scale data, level-of-distinction name data, level-of-distinction-specific grading and credit scale data, grade weight, and credit weight data are manually or automatically input into database 104. In some exemplary embodiments, database 104 may be a relational database management system (RDBMS), such as Oracle Database 10G. The data may be based on research conducted by expert educational credential evaluators.

At a step 2004, the data tables in the RDBMS, are uploaded into a second database, for example another relational database management system (RDBMS), such as Microsoft SQL Server 2008.

At a step 2006, the data tables in the second RDBMS are accessed via a web-based application by the user (e.g., ordering clients for student applicants and student applicants themselves). The web-based application may be developed using various web-scripting interfaces and languages, such as Active Server Pages (ASP), Cascading Style Sheets (CSS), Visual Basic Scripting Edition (VBScript), and/or JavaScript. In other exemplary embodiments, the application may be locally installed on a computer system.

Figure 21:
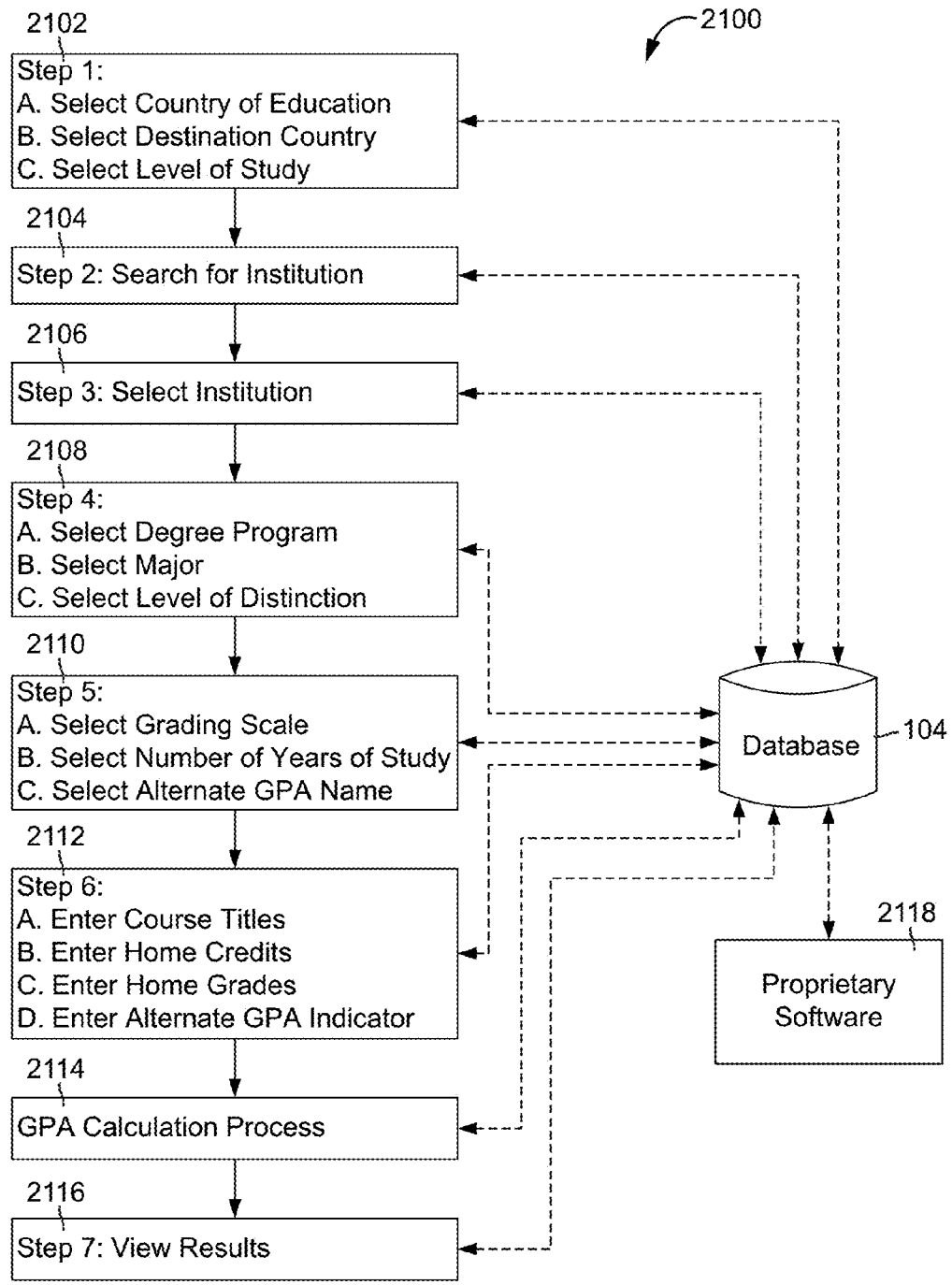
FIG. 21 is a flowchart illustrating a method for converting scholastic grades, according to an exemplary embodiment.

Referring to FIG. 21, a method 2100 is illustrated for converting scholastic grades using system 100, according to an exemplary embodiment. At a step 2102, a user selects a country of education, a destination country, and a level of study. At a step 2104, the user inputs a name or partial name of an institution and performs a search for the institution. At a step 2106, the user selects one of the results from the institution search. At a step 2108, the user selects a degree program, a major, and a level of distinction. At a step 2110, the user selects a grading scale, the number of years of study, and an alternate GPA name. At a step 2112, the user enters course title, credits, and grades from the home country as well as indicators of which course should be included in the alternate GPA. At a step 2114, server 102 executes the GPA calculation process (described in further detail below) and determines converted GPAs and credits for the destination country. At a step 2116, server 102 sends the results to computer system 106 and displays them to the user for viewing and/or printing. Each of the user entries and selections is made on computer system 106 and sent to server 102 using proprietary software 2118. Server 102 communicates with database 104 to obtain additional information for each user entry or selection and bases the calculations on the user entries and data retrieved from database 104.

Exemplary embodiments of the methods provided herein provide for the conversion of scholastic grades and credits from one scale to an alternative scale. One method for using system 100 is described below according to an exemplary embodiment, however it is noted that other systems and methods than explicitly described here may be used.

Basic Entry (all fields entered are in the Applicant Summary Table)

1. The user enters a student name (optional). (The entry is stored in the Student Name field.)
2. The user selects a home country of education from a dropdown list of countries. (The selection is stored in the Home Country ID field.)
3. The user selects a destination country. (The selection is stored in the Destination Country ID field.) (In some embodiments, the user can enter in multiple destination countries.)
4. The user will be prompted to select the level of study from a dropdown list that is specific to the country of education. (The selection is stored in the Home Level of Study ID field.)
5. If specific institution grading or credit scales are available in the selected country of education (given the level-of-education specified), the user will be prompted to search for and select the name of an institution. (The selection is stored in the Home Institution ID field.)
6. If specific degree-program grading or credit scales are available in the selected country of education (given the level-of-education specified), the user will be prompted to select the name of a degree program in the country of education from a drop down list. (The selection is stored in the Home Degree Program ID field.)
7. If specific major grading or credit scales are available in the selected country of education (given the level-of-education specified), the user will be prompted to select the name of a major in the country of education from a dropdown list. (The selection is stored in the Home Major ID field.)
8. If specific level-of-distinction grading or credit scales are available in the selected country of education (given the level-of-education specified), the user will be prompted to select the name of a level of distinction from a dropdown list. (The selection is stored in the Home Level of Distinction ID field.)
9. Once the fields above have been entered, if there is a choice of more than one country-of-education grading scale:
    i. The user will be prompted to select a grading scale.
    ii. The user then selects a grading scale to proceed. (The selection is stored in the Home Grading Scale ID field.)
10. If the user has not selected a grading scale, then the system determines an appropriate Grading Scale based on a combination of country of education, level of study, and possibly home institution, home degree program, home major, and home level of distinction. The selected Grading Scale ID is stored in the Home Grading Scale ID field.
11. The system determines an appropriate Credit Scale (if one is available) based on a combination of country of education, level of study, and possibly home institution, home degree program, home major and home level of distinction. The Credit Scale ID, if one is available, is stored in the Home Credit Scale ID field.
12. The user selects the number of years of study (0.5 to 6 in increments of 0.5 years). (The selection is stored in the Years of Study field.)
13. The user has the option of choosing to have an alternate GPA (grade point average) calculated. This is done by choosing a name for the Alternate GPA, e.g., "Major," or "Last 2 Years of Study". (The entry is stored in the Alternate GPA Name field.) (In some embodiments, the user may choose to have more than one alternate GPA calculated, e.g., "2$^{nd}$ Major".)

14. (In some embodiments, once the fields above have been entered, and, if there is a choice of more than one grading or credit scale for the destination country, the user would be prompted to select a grading and/or credit scale. In such case, the user would then select a grading and/or credit scale.)

15. (In some embodiments, there would be options to facilitate transfer credits using specific destination grading and/or credit scales. This would be accomplished by allowing the user to enter a destination institution, a destination degree program, and/or a destination major to find specific destination grading or credit scales.)

16. (In some embodiments, users would have the option to enter user-defined grading or credit scales. E.g., an institution using the International GPA Calculator with its own particular grading or credit scale, enters the scale(s) and subsequently uses the scales(s) for converting grades and credits and calculating GPAs.")

17. (In some embodiments, the system has provisions for users with study in multiple institutions multiple degree programs, and/or multiple countries.)

Course Entry

1. The user enters course titles (optional) into the worksheet. (The course titles are stored in the Course Name field in the Course Table.)
2. The user enters the Home Country Credits (Maximum Marks for some countries) for each course.
   a. The user enters credits via a text box. If a credit scale is available, the credits entered will have to fall within the values set in the Credit Range Min and the Credit Range Max fields (in the Credit Scale Name Table) for the selected Credit Scale.
   b. The Home Country Credits entered are stored in the Home Country Credits field (in the Course Table).
3. The user selects or enters the Home Country Grade (or marks obtained) for each course.
   a. If the set Grading Scale has an indicator of "D" in the Grade Entry Type field (in the Grading Scale Name Table), then the user will select a grade from a drop-down list of available home country grades.
   b. If the set Grading Scale has an indicator of "T", then the user will enter grades via a text box, and the grades entered will have to fall within the values set in the Grade Range Min and the Grade Range Max fields (in the set Grading Scale Name Table).
   c. The Home Country Grades selected or entered are stored in the Home Country Grade field (in the Course Table).
4. For certain home countries (those with an "M" in the Country Type field of the Country Name Table, e.g., India, Bangladesh, Pakistan, Burma, and Nepal):
   a. Certain entry fields will appear differently: "Home Country Credits" will appear as "Maximum Marks" and "Home Country Grade" will appear as "Marks Obtained". (Other country-specific changes in nomenclature may appear on entry screens for other countries.)
   b. The value entered for "Marks Obtained" cannot exceed the "Maximum Marks" provided.
   c. The user enters the minimum marks for passing for each course. (This is stored in the Minimum Marks field in the Course Table.)
5. If the user has chosen a name in the "Alternate GPA Name" field (stored in the Applicant Summary Table), then the system will display a check-off box in the row of each course under the Alternate GPA Name chosen (e.g., "Major", "Last 2 Years of Study"). The user has the option of selecting courses to be included in the calculation of the alternate GPA. In addition, the total credits of these courses will also be calculated as "Total Alternate Destination Credits". Alternate GPA Indicators are stored in the Alternate GPA Indicator field (in the Course Table). (In some embodiments, the user may choose to have more than one alternate GPA calculated.)

Credit Weight Calculation

1. The Home Country Credits (or Maximum Marks) entered are stored in the Home Country Credit field in the Course Table.
2. As Home Country Credits are entered by the user, the system uses the credit scale selected by the user (if one is available) to convert each course's credits into a Credit Weight. (This is stored in the Credit Weight field in the Course Table.) The conversion is done as follows:
   a. The system searches for a match of the Home Country Credits (stored in the Course Table) within a range of the Credit Start and Credit End fields of the selected credit scale (in the Credit Scale Detail Table). (Only ranges not marked with an "D" in the Credit Use Indicator field are searched.)
   b. Once a Home Country Credit is matched, the system copies its Credit Weight field equivalent value (in the Credit Scale Detail Table) to the Credit Weight field (in the Course Table).
3. If no Credit Scale Detail Table is available for the home country, the Credit Weight for each course is calculated as follows:
   a. Credits Based on Number of Years of Study is calculated by multiplying the Years of Study by 30.
   b. A Credit Multiplier is calculated by dividing the Credits Based on Number of Years of Study by the sum of the Home Country Credits:

$$\text{Multiplier} = \frac{\text{Credits Based on Number of Years of Study}}{\sum \text{Home Country Credits}}$$

c. The Credit Weight of a course is then calculated by multiplying the Credit Multiplier by the Home Country Credits for the course and rounded to the nearest 0.5.
   Credit Weight=Home Country Credit×Credit Multiplier (rounded to the nearest 0.5)
   d. If a credit scale is not available and credit weight must by calculated using the Credit Multiplier, then the Credit Weights for each course cannot be set until the Home Country Credits for all the courses are entered and totaled.

Grade Weight Calculation

1. The Home Country Grades (or Marks Obtained) entered are stored in the Home Country Grade field (in the Course Table).
2. As home country grades are selected or entered by the user, the system uses the grading scale selected by the user or system to convert each grade into a Grade Weight. (This is stored in the Grade Weight field in the Course Table.) The conversion is done as follows:
   a. If the selected grading scale has an entry of "D" in the Grade Entry Type field (of the Grading Scale Name Table), then the system will search the Grade Start fields of that grading scale (in the Grading Scale

- Detail Table) for a match of the Home Country Grade (stored in the Course Table).
- b. If the selected grading scale has an entry of "T" in the Grade Entry Type field (of the Grading Scale Name Table), the system will search for a match of the Home Country Grade (stored in the Course Table) within a range of the Grade Start and Grade End fields (of the Grading Scale Detail Table).
- c. Once a Home Country Grade is matched, the system copies its Grade Weight field equivalent value (in the Grading Scale Detail Table) to the Grade Weight field (in the Course Table).
3. If the Home Country Grade is the equivalent of a "Pass" in a pass/fail course, no entry is made in the Grade Weight field, but an indicator of Pass for the course is set. (This is stored in the Pass field in the Course Table.)
4. For certain home countries (those with an "M" in the Country Type field of the Country Name Table, e.g., India, Bangladesh, Pakistan, Burma, and Nepal), alternate or additional steps occur:
  - a. For any course with Marks Obtained (stored as Home Country Grade) less than the Minimum Marks, the system sets the Grade Weight to 0.
  - b. For all other courses, the system takes the Marks Obtained (stored as Home Country Grade) and divides it by the Maximum Marks (stored as Home Country Credits). The resultant, Home Country Grade %, is converted by the selected grading scale into a Grade Weight. (This is stored in the Grade Weight field in the Course Table.)

Destination Credit Conversion

1. For destination countries, the system determines the correct credit scale to use to establish equivalent Destination Credits to the Credits Weights that have been set in the Course Table.
2. Credit scale selection is based on destination country and level of study of the home country. The selected credit scale is stored in the Destination Credit Scale ID field in the Applicant Summary Table.
3. The system will search for a match of the Credit Weight of the Home Country Credits (stored in the Course Table) within a range of the Credit Weight Start and Credit Weight End fields of the Destination Country (in the Credit Scale Detail Table).
  - a. For certain destination countries (those with an "M" in the Country Type field of the Country Name Table, e.g., India, Bangladesh, Pakistan, Burma, and Nepal), the system will only search credit weight ranges that have the "Credit Use Indicator" set to "D".
4. Once a Credit Weight is matched, the system will copy the corresponding destination credit ranges, i.e., the Destination Credit Start field and the Destination Credit End field (if populated) from the Grading Scale Detail Table to the Course Table.

Destination Country Grade Conversion

1. For destination countries, the system determines the correct grading scale to use to establish equivalent Destination Grades to the Grade Weights that have been set in the Course Table.
  - a. Grading Scale selection is based on destination country, and. when appropriate, level of study, degree program and major.
  - b. For level of study, degree program and major, the system uses the selections (if any) made in these fields for the home country to match for possible specific home country grading scales. (E.g., a student with post-secondary education in Nigeria in a Bachelor of Science degree program with a major in Civil Engineering designates Paraguay as a destination country. The system will search for post-secondary-school Paraguayan grading scales, and then further search to see if there are specific grading scales in Paraguay for Bachelor of Science degrees as well as for Civil Engineering majors.)
  - c. The selected grading scale is stored in the Destination Grading Scale ID field in the Applicant Summary Table.
2. The system will search for a match of the Grade Weight of the Home Country Grade (stored in the Course Table) within a range of the Grade Weight Start and Grade Weight End fields of the Destination Country (in the Grading Scale Detail Table).
  - a. The system only matches on Grading-Scale-Detail-Table entries marked by an "S", "R" or "M" in the Destination field.
  - b. Once a Grade Weight is matched, the system will copy the corresponding destination grade ranges from the Grading Scale Detail Table to the Course Table.
    - i. If the Destination field (in the Grading Scale Detail Table) has an entry of "R", both the Grade Start and Grade End fields (in the Grading Scale Detail Table) of the destination grade are copied to the Destination Grade Start and Destination Grade End fields (in the Course Table).
    - ii. If the Destination field (in the Grading Scale Detail Table) has an entry of "S", only the Grade Start field of the destination grade (in the Grading Scale Detail Table) is copied to the Destination Grade Start field (in the Course Table).
    - iii. If the Destination field (in the Grading Scale Detail Table) has an entry of "M", see #4 below.
3. If the Grade Weight field is blank, and the Pass field has an entry indicating the equivalent of a "Pass" in a pass/fail course, then the system converts "Pass" into the equivalent destination grade range for "Pass". (This is stored in the Destination Grade Start and Destination Grade End fields in the Course Table.) If there is no destination grade range, only a specific destination grade, then only the Destination Grade Start field is utilized.
4. For certain destination countries (those with an "M" in the Country Type field of the Country Name Table, e.g., India, Bangladesh, Pakistan, Burma, and Nepal):
  - a. The system only matches on Grading-Scale-Detail-Table entries marked by an "M" in the Destination field.
  - b. Rather than convert Grade Weights into destination grade ranges, the Grading Scale Detail Table converts each Grade Weight into a Destination Grade %.
  - c. The system then multiplies the Destination Grade % by the Destination Maximum Marks (stored as Destination Credits).
  - d. The product is the Destination Marks stored as Destination Grade in the Destination Grade Start field (in the Course Table).

GPA Calculation

1. For most destination countries (those without an "M" in the Country Type field of the Country Name Table:
  - a. For each course (except for courses with an indicator in the "Pass" field), the Credit Weight is multiplied by the Grade Weight to get the Course Points for the course:
    Course Points=Credit Weight×Grade Weight b. The sum of the Course Points for all the courses (except for courses with an indicator in the "Pass" field) are divided by the sum of the Credit Weights of all the courses (except for courses with an indicator in the "Pass" field) to get the GPA Weight. This is stored in the GPA Weight field in the Applicant Summary Table:

$$GPA\ Weight = \frac{\sum Course\ Points\ (excluding\ "Pass"\ courses)}{\sum Credit\ Weights\ (excluding\ "Pass"\ courses)}$$

c.
  i. For countries without a "U" in the Country Type field of the County Name Table:
    Using pre-assigned Grade Weights in the Grading Scale Detail Table, the GPA Weight is converted into a Destination GPA. This is stored in the Destination GPA field in the Applicant Summary Table).
  ii. For countries with a "U" in the Country Type field of the County Name Table (e.g., the U.S.):
    Destination GPA=GPA Weight.
  iii. The Destination GPA is stored in the Destination GPA field in the Applicant Summary Table.
2. For certain destination countries (those with an "M" in the Country Type field of the Country Name Table, e.g., India, Bangladesh, Pakistan, Burma, and Nepal), the system takes the total of Destination Marks (stored as Destination Grades) and divides them by the total Maximum Marks (stored as Destination Credits) and calculates a Weighted Percentage (stored as Destination GPA):

$$\frac{Weighted\ Percentage(stored\ as\ Destination\ GPA)}{(presented\ as\ a\ percentage)} = \frac{\sum Destination\ Marks\ Obtained\ (stored\ as\ Destination\ Credits)}{\sum Destination\ Maximum\ Marks\ (stored\ as\ Destination\ Credits)}$$

(All Pass/Fail courses with the equivalent grade of "Pass" are excluded from the calculation.)
Alternate GPA Calculation
1. For most destination countries (those without an "M" in the Country Type field of the Country Name Table:
  a. If the Applicant Summary Table contains a name chosen by the user in the field, "Alternate GPA Name", and the Course Table has at least one course with the field "Alternate GPA Indicator" set, then the system calculates the Alternate GPA using the same process as in the step above—"GPA Calculation". However, only the courses that have been selected by the user by checking the "Alternate GPA" check-off box in Step 2—Course Entry (above) will be included in the Alternate GPA calculation.
  b. For each course selected for an Alternate GPA (except for courses with an indicator in the "Pass" field), the Credit Weight is multiplied by the Grade Weight to get the Course Points for the course:
    Course Points (only for courses selected for an Alternate GPA)=Credit Weight×Grade Weight
  c. The sum of the Course Points for all the courses selected for an Alternate GPA (but not including courses with an indicator in the "Pass" field) are divided by the sum of the Credit Weights of these courses (but not including courses with an indicator in the "Pass" field) to get the Alternate GPA Weight (this is stored in the Alternate GPA Weight field in the Applicant Summary Table):

$$\frac{Alternate\ GPA\ Weight}{(only\ for\ courses\ selected\ for\ an\ Alternate\ GPA)} = \frac{\sum Course\ Points\ (excluding\ "Pass"\ courses)}{\sum Credit\ Weights\ (excluding\ "Pass"\ courses)}$$

d.
  i. For countries without a "U" in the Country Type field of the County Name Table:
    Using pre-assigned Grade Weights in the Grade Conversion table, the Alternate GPA Weight is converted into an Alternate Destination GPA.
  ii. For countries with a "U" in the Country Type field of the County Name Table (e.g., the U.S.):
    Alternate Destination GPA=Alternate GPA Weight.
2. For certain destination countries (those with an "M" in the Country Type field of the Country Name Table, e.g., India, Bangladesh, Pakistan, Burma, and Nepal), the system takes the total of Destination Marks of a set of selected courses (stored as Destination Grades) and divides them by the total Maximum Marks (stored as Destination Credits) and calculates the Weighted Percentage of Alternate Courses (stored as Alternate Destination GPA):

$$\frac{Weighted\ Percentage\ of\ Alternate\ Course}{(stored\ as\ Alternate\ Destination\ GPA)(presented\ as\ a\ percentage)} = \frac{\sum Destination\ Marks\ Obtained\ (stored\ as\ Destination\ Grades)}{\sum Destination\ Maximum\ Marks\ (stored\ as\ Destination\ Credits)}$$

(All Pass/Fail courses with the equivalent grade of "Pass" are excluded from the calculation.)
  3. The Alternate Destination GPA is stored in the Alternate Destination GPA field in the Applicant Summary Table.
Total Credit Calculation
1. The Destination Credits for all the courses are totaled to get the Total Destination Credits. (This is stored in the "Total Destination Credits" field in the Applicant Summary Table.)
  Total Destination Credits=ΣDestination Credits
Total Alternate Destination Credit Calculation
1. The Destination Credits for a set of selected courses are totaled to get the Total Alternate Destination Credits. (This is stored in the "Total Alternate Destination Credits" field in the Applicant Summary Table.)
  Total Alternate Destination Credits=ΣDestination Credits of selected courses
Display of Results
1. The server 102 queries all of the necessary information (e.g. GPA, Alternate GPA, Credits, Grades) from database 104.
2. The data from database 104 is converted to HTML to allow it to be displayed.

The data tables used in system 100 are based on data extracted from proprietary software, which runs on a relational database management system (RDBMS), such as Oracle Database 10G. Information regarding the history and screening of the data contained in, and used for, the application is described above.

Aspects of the present systems and methods may be implemented on one or more computers executing software instructions. According to one embodiment, server and client computer systems transmit and receive data over a computer network or a fiber or copper-based telecommunications network. The steps of receiving data, converting data, analyzing the data, and presenting the revised data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the methods described herein.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instruction over the network connection, it stores the instructions in memory. The server may store the instructions for later execution, or it may execute the instructions as they arrive over the network connection. In some cases, the CPU may directly support the downloaded instructions. In other cases, the instructions may not be directly executable by the CPU and may instead be executed by an interpreter that interprets the instructions. In other embodiments, hardwired circuitry may be used in place of, or in combination with, software instructions to implement the present invention. Thus, the present systems and methods are not limited to any specific combination of hardware circuitry and software, or to any particular source for the instructions executed by the server or client computers. Further, in some instances, client and server functionality may be implemented on a single computer platform.

Embodiments of the systems and methods can be implemented in a distributed electronic commerce environment that includes a client/server network system linking one or more server computers to one or more client computers, as well as server computers to other server computers and client computers to other client computers. The client and server computers may be implemented as desktop personal computers, workstation computers, mobile computers, portable computing devices, personal digital assistant (PDA) devices, cellular telephones, digital audio or video playback devices, or any other similar type of computing device. For purposes of the following description, the terms "network" and "online" may be used interchangeably and do not imply a particular network embodiment or topography. In general, any type of network (e.g., LAN, WAN, or Internet) may be used to implement the online or computer networked implementation.

While the embodiments of the present invention are described in conjunction with scholastic grades, the scope is not so limited and as such is applicable to any data conversion wherein a method of scaling may be established and used to covert numbers or other ratings into an alternate rating or scaling standard.

One exemplary embodiments of the system and method for providing grade, credit, and GPA calculations is described as follows, however it is noted that other systems and methods than explicitly described here may be used.

A. Formula(s):
1. Basic Calculations
   a. Credit Weight
      i. If an appropriate credit scale is available in the Credit Scale Detail Table:
         (1) Credit Weight=Credit Scale Detail Table equivalent of the Home Country Credits
      ii. If an appropriate credit scale is not available in the Credit Scale Detail Table:
         (1) Credits Based on Number of Years of Study=30× Number of Years of Study $$(2)\ \text{Credit Multiplier} = \frac{\text{Credits Based on Number of Years of Study}}{\sum \text{Home Country Credits}}$$

(3) Credit Weight=Credit Multiplier×Home Country Credits (product is rounded to nearest 0.5)
   b. Grade Weight
      i. For most home countries (those without an "M" in the Country Type field of the Country Name Table):
         Grade Weight=Grading Scale Detail Table equivalent of the Home Country Grade
      ii. For certain home countries (those with an "M" in the Country Type field of the Country Name Table, e.g., India, Bangladesh, Pakistan, Burma, and Nepal):
         (1) If Marks Obtained (stored as Home Country Grade)<Minimum Marks, then Grade Weight=0
         (2) Otherwise,
            (a) Home Country Grade %=Marks Obtained (stored as Home Country Grade) Maximum Marks (stored as Home County Credits)
            (b) Grade Weight=Grading Scale Detail Table equivalent of the Home Grade %
   c. Destination Credits
      i. Destination Credits=Credit Scale Detail Table equivalent of the Credit Weight
   d. Destination Grade
      i. For most destination countries (those without an "M" in the Country Type field of the Country Name Table):
         (1) Destination Grade=Grading Scale Detail Table equivalent of the Grade Weight
      ii. For certain destination countries (those with an "M" in the Country Type field of the Country Name Table, e.g., India, Bangladesh, Pakistan, Burma, and Nepal):
         (1) Destination Grade %=Grading Scale Detail Table equivalent of the Grade Weight
         (2) Destination Marks (stored as Destination Grade) =Destination Grade %×Maximum Marks (stored as Destination Credits)
2. Calculating GPA
   a. For most destination countries (those without an "M" in the Country Type field of the Country Name Table):
      i. Course Points (for a course)=Credit Weight×Grade Weight $$\text{ii. } GPA\ \text{Weight} = \frac{\sum \text{Course Points}}{\sum \text{Credit Weights}}$$

iii. For countries without a "U" in the Country Type field of the County Name Table:

Destination GPA=Grading Scale Detail Table equivalent of the GPA Weight
iv. For countries with a "U" in the Country Type field of the County Name Table (e.g., the U.S.):
Destination GPA=GPA Weight
(All Pass/Fail courses with the equivalent grade of "Pass" are excluded from the calculations.)
b. For certain destination countries (those with an "M" in the Country Type field of the Country Name Table, e.g., India, Bangladesh, Pakistan, Burma, and Nepal):

$$\text{Weighted Percentage (stored as Destination } GPA) \atop \text{(presented as a percentage)} = \frac{\sum \text{Destination Marks (stored as Destination Grades)}}{\sum \text{Destination Maximum Marks} \atop \text{(stored as Destination Credits)}}$$

(All Pass/Fail courses with the equivalent grade of "Pass" are excluded from the calculations.)
3. Calculating Alternate GPA
a. For most destination countries (those without an "M" in the Country Type field of the Country Name Table):
i. Course Points (for selected course)=Credit Weight× Grade Weight $$\text{ii. Alternate } GPA \text{ Weight} = \frac{\sum \text{Course Points of selected courses}}{\sum \text{Credit Weights of selected courses}}$$

iii. For countries without a "U" in the Country Type field of the County Name Table:
Alternate Destination GPA=Grading Scale Detail Table Equivalent of the Alternate GPA Weight of the selected courses
iv. For countries with a "U" in the Country Type field of the County Name Table (e.g., the U.S.):
Alternate Destination GPA=Alternate GPA Weight of the selected courses
(All Pass/Fail courses with the equivalent grade of "Pass" are excluded from the calculations.)
b. For certain destination countries (those with an "M" in the Country Type field of the Country Name Table, e.g., India, Bangladesh, Pakistan, Burma, and Nepal):

$$\text{Weighted Percentage of Alternate Courses (stored as} \atop \text{Alternate Destination } GPA \text{ and presented as a percentage)} = \frac{\sum \text{Destination Marks of Alternate} \atop \text{Courses (stored as Destination Grades)}}{\sum \text{Destination Maximum Marks of} \atop \text{Alternate Courses (stored as Destination Credits)}}$$

(All Pass/Fail courses with the equivalent grade of "Pass" are excluded from the calculations.)
4. Calculating Total Credits
a. Total Destination Credits=Destination Credits
5. Calculating Total Alternate Credits
a. Total Alternate Destination Credits=Destination Credits of selected courses
B. Explanation of Formula(s):
1. Basic Calculations
a. Credit Weight
i. Using pre-assigned Credit Weights (based on 30 credits representing an average one year of full-time study) in the Credit Scale Detail Table for the home country, level of study, (and, if appropriate, institution, degree program, major and level of distinction), Home Country Credits are converted into Credit Weights.
ii. If an appropriate credit scale is not available in the Credit Scale Detail Table for the particular country of education, Credit Weights are calculated as follows:
(1) The number of full-time years of study are multiplied by 30, to get the number of Credits Based on Number of Years of Study.
(2) The number of Credits Based on Number of Years of Study are divided by the total of Home Country Credits to get the Credit Multiplier.
(3) The Credit Multiplier is multiplied by the Home Country Credits for each course and rounded to the nearest 0.5 to get the Credit Weight for each course.
b. Grade Weight
i. For most home countries (those without an "M" in the Country Type field of the Country Name Table): using pre-assigned Grade Weights (on a 0-4 scale) in the Grading Scale Detail Table for the home country, level of study, (and, if appropriate, institution, degree program, major and level of distinction), Home Country Grades are converted into numerical Grade Weights.
ii. For certain home countries (those with an "M" in the Country Type field of the Country Name Table, e.g., India, Bangladesh, Pakistan, Burma, and Nepal):
(1) For any course with Marks Obtained (stored as Home Country Grade) less than the Minimum Marks for the course, the system sets the Grade Weight to 0.
(2) For any other course, the system takes the Marks Obtained (stored as Home Country Grade) and divides it by the Maximum Marks (stored as Home Country Credits). The resultant, Home Country Grade %, is converted by the Grading Scale Detail Table for the home country, level of study (and, if appropriate, institution, degree program, major and level of distinction) into a Grade Weight.
c. Destination Credits
i. Using pre-assigned Credit Weights in the Credit Scale Detail Table, Credit Weights are converted into Destination Credits.
d. Destination Grades
i. For most destination countries (those without an "M" in the Country Type field of the Country Name Table), using pre-assigned Grade Weights in the Grading Scale Detail Table, Grade Weights are converted into Destination Grades.
ii. For certain destination countries (those with an "M" in the Country Type field of the Country Name Table, e.g., India, Bangladesh, Pakistan, Burma, and Nepal):
(1) Using pre-assigned Grade Weights in the Grading Scale Detail Table, Grade Weights are converted into the equivalent Destination Grade %.
(2) The system then multiplies the Destination Grade % by the Destination Maximum Marks (stored as Destination Credits). The product is the Destination Marks (stored as Destination Grade).
2. Calculating GPA
a. For most destination countries (those without an "M" in the Country Type field of the Country Name Table):

i. The Credit Weight of each course (excluding Pass/Fail courses with the equivalent grade of "Pass") is multiplied by the Grade Weight to get the Course Points for the course.
   ii. The sum of the Course Points for all the courses (excluding Pass/Fail courses with the equivalent grade of "Pass") is divided by the sum of the Credit Weights for all the courses to get the GPA Weight.
   iii. For countries without a "U" in the Country Type field of the County Name Table, using pre-assigned Grade Weights in the Grading Scale Detail Table, the GPA Weight is converted into a Destination GPA.
   iv. For countries with a "U" in the Country Type field of the County Name Table (e.g., the U.S.), the Destination GPA is the same as the GPA Weight.
  b. For certain destination countries (those with an "M" in the Country Type field of the Country Name Table, e.g., India, Bangladesh, Pakistan, Burma, and Nepal):
   i. The system takes the total of Destination Marks (stored as Destination Grades) and divides them by the total of Destination Maximum Marks (stored as Destination Credits) and calculates a Weighted Percentage (Stored as Destination GPA).
(All Pass/Fail courses with the equivalent grade of "Pass" are excluded from the calculation.)
 3. Calculating Alternate GPA (similar to the GPA calculation, but done for a subset of Courses)
  a. For most destination countries (those without an "M" in the Country Type field of the Country Name Table):
   i. The Credit Weight of each course (excluding Pass/Fail courses with the equivalent grade of "Pass") in a set of selected courses is multiplied by the Grade Weight to get the Course Points for the course.
   ii. The sum of the Course Points for all the courses (excluding Pass/Fail courses with the equivalent grade of "Pass") in a set of selected courses is divided by the sum of the Credit Weights for all the courses in the set to get the Alternate GPA Weight.
   iii. For countries without a "U" in the Country Type field of the County Name Table, using pre-assigned Grade Weights in the Grading Scale Detail Table, the Alternate GPA Weight is converted into an Alternate Destination GPA.
   iv. For countries with a "U" in the Country Type field of the County Name Table (e.g., the U.S.), the Alternate Destination GPA is the same as the Alternate GPA Weight.
  b. For certain destination countries (those with an "M" in the Country Type field of the Country Name Table, e.g., India, Bangladesh, Pakistan, Burma, and Nepal):
   i. The system takes the total of Destination Marks (stored as Destination Grades) of a set of selected courses and divides them by the total Maximum Marks (stored as Destination Credits) of the set and calculates the Weighted Percentage of Alternate Courses (stored as Alternate Destination GPA).
(All Pass/Fail courses with the equivalent grade of "Pass" are excluded from the calculation.)
 4. Calculating Total Credits
  a. The Destination Credits for all the courses are totaled to get the Total Destination Credits.
 5. Calculating Total Alternate Credits
  a. The Destination Credits for a set of selected courses are totaled to get the Total Alternate Destination Credits.

In one exemplary embodiment, the program term, a year, equates to 30 credits. While one exemplary embodiment is described as illustrated, such credit definitions are not intended to be a limitation on the present invention. It is contemplated with the scope of the embodiments that a program term could be defined in that semesters, quarters, trimesters, or any other period of time so suitable for the scholastic coursework.

The present disclosure may be embodied as systems, methods, or devices. Accordingly, the exemplary embodiments may take the form of an entirely hardware embodiment, an entirely software embodiment or an embodiment combining software and hardware aspects. Moreover, the embodiments should not be interpreted as limited to web-based applications, such is merely provided by way of example and for ease of understanding. The detailed description is, therefore, not to be construed in a limiting sense. As described, various embodiments of the invention may be readily combined, without departing from the scope or spirit of the invention.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any computer or machine-readable media for accomplishing its operations. The embodiments of the present invention may be implemented using existing computer processors, or by a special purpose computer processor for an appropriate system, incorporated for this or another purpose or by a hardwired system.

Embodiments within the scope of the present invention may include program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were shown and described in order to explain the principals of the invention and its practical application to enable one skilled in the art to utilize the invention in various embodiments and with various modifications as are suited to the particular use contemplated.

What is claimed is:

1. A system for converting educational credentials from a first country to credentials for a second country, comprising:
a database storing data related to grading scales and credit scales for educational credentials for a plurality of countries, the database comprising for each country and each grade weight: a country grade start field, a country grade end field, grade weight field, a grade weight start field, and a grade weight end field, the country grade start field and a country grade end field defining a range of country grades for a grade weight in the grade weight field, the grade weight start field and the grade weight end field defining an intermediate grade range for the grade weight in the grade weight field; and
a processor receiving data from a user related to course grades and credits earned in the first country and a selection of the second country from among the plurality of countries, wherein the second country has a grading scale and a credit scale that is different from the grading scale and the credit scale of the first country, the processor converting the course grades and credits earned in the first country to intermediate grades and intermediate credits, wherein the intermediate grades and the intermediate credits represent numeric values of the course grades and credits earned based on the grading scale and the credit scale of the first country, the processor retrieving data related to the grading scale and the credit scale of the second country from the database based on the user data, the grading scales and credit scales of a plurality of countries being retrievable in the database, the processor converting the intermediate grades and the intermediate credits to equivalent grades, credits, and grade point averages in the grading scale and the credit scale of the second country based on the data from the database, the processor providing the grades, credits, and grade point averages equivalent in the grading scale and the credit scale of the second country to an electronic display for display to the user, wherein the processor determines the intermediate grades using the course grades earned in the first country and the country grade weight start field and the country grade weight end field for the first country to determine a corresponding grade weight, and wherein the processor determines the grades of the second country using the corresponding grade weight and the country weight start field and the country weight end field for the second country, wherein the grades of the second country are provided as a range corresponding to the country weight start field and the country weight end field for the second country.

2. The system of claim 1, wherein the course grades entered by the user are numeric, letter, or descriptive grades, and wherein the database comprises a destination field and if the destination field is set to a start indication, the processor determines the grades of the second country using the grade weight start field without the grade weight end field for the second country.

3. The system of claim 1, wherein the user data further comprises additional data related to at least one of level of study, institution name, degree name, major name, grading scale, years of study, level of distinction, and course name from the first country, wherein the additional data is used by the processor to determine the grades, credits, and grade point average equivalent in the second country.

4. The system of claim 1, wherein the user data further comprises data related to selection of a subset of the course grades entered for calculation of an alternate grade point average by the processor.

5. The system of claim 1, wherein the processor executes on a server, and wherein the database comprises a pass field and if the pass field is set to a pass indication, the processor determines the grades of the second country using an equivalent pass range.

6. The system of claim 5, wherein the server executes a webpage accessible by a remote computer system to facilitate data entry by the user.

7. The system of claim 1, wherein the database is a relational database and wherein the database comprises a destination field and if the destination field is set to a first indication, the processor determines the grades of the second country using the intermediate grades and a corresponding destination percentage for the second country.

8. The system of claim 1, wherein the user data and the grades, credits, and grade point average equivalent in the second country are provided to the database for storage.

9. The system of claim 1, wherein the processor converts course grades and credits earned in a country that is not the United States of America to grades, credits, and grade point averages that are used in the United States of America, wherein the intermediate grades are provided according to a 4.0 scale used in the United States of America, wherein a range for the intermediate grades are provided using the grade weight start field and the grade weight end field.

10. The system of claim 1, wherein the processor converts course grades and credits earned in the first country to a numeric weight, the processor using the numeric weight to calculate grades, credits, and grade point averages for use in the second country.

11. A method for converting educational credentials from a first country to credentials for a second country, comprising:
receiving first data from a user at a processor, the first data related to course grades and credits earned in the first country and a selection of the second country from among a plurality of countries, wherein the second country has a grading scale and a credit scale that is different from the grading scale and the credit scale of the first country;
retrieving second data from a database using the processor based on the first data, wherein the database comprises data related to grading scales and credit scales for educational credentials for a plurality of countries, the second data related to the grading scale and the credit scale of the second country, the database further comprising for each country and each grade weight: a country grade start field, a country grade end field, grade weight field, a grade weight start field, and a grade weight end field, the country grade start field and a country grade end field defining a range of country grades for a grade weight in the grade weight field, the grade weight start field and the grade weight end field defining an intermediate grade range for the grade weight in the grade weight field;
converting the course grades and credits earned in the first country to intermediate grades and intermediate credits, wherein the intermediate grades and the intermediate credits represent numeric values of the course grades and credits earned based on the grading scale and the credit scale of the first country, wherein the processor determines the intermediate grades using the course grades earned in the first country and the country grade weight start field and the country grade weight end field for the first country to determine a corresponding grade weight;

converting the intermediate grades and the intermediate credits to equivalent grades, credits, and grade point averages in the grading scale and the credit scale of the second country based on the second data using the processor, wherein the processor determines the grades of the second country using the intermediate grades and the country grade start field and country grade end field for the second country, and wherein the processor determines the grades of the second country using the corresponding grade weight and the country weight start field and the country weight end field for the second country; and providing the grades, credits, and grade point average equivalent in the grading scale and the credit scale of the second country to an electronic display from the processor for display to the user, wherein the grades of the second country are provided as a range corresponding to the country weight start field and the country weight end field for the second country.

12. The method of claim 11, wherein the course grades entered by the user are numeric, letter or descriptive grades.

13. The method of claim 11, further comprising:
receiving additional user data related to at least one of level of study, institution name, degree name, major name, grading scale, years of study, level of distinction, and course name from the first country at the processor;
determining the grades, credits, and grade point average equivalent in the second country based on the additional data using the processor.

14. The method of claim 11, further comprising:
receiving additional data related to selection of a subset of the course grades entered at the processor;
calculating an alternate grade point average based on the additional data using the processor.

15. The method of claim 11, wherein the processor executes on a server, the server executing a webpage accessible by a remote computer system to facilitate data entry by the user.

16. The method of claim 11, wherein the database is a relational database.

17. The method of claim 11, further comprising:
providing the user data and the grades, credits, and grade point average equivalent in the second country to the database from the processor for storage.

18. The method of claim 11, wherein the processor converts course grades and credits earned in a country that is not the United States of America to grades, credits, and grade point averages that are used in the United States of America.

19. The method of claim 11, wherein the processor converts course grades and credits earned in the first country to a numeric weight, the processor using the numeric weight to calculate grades, credits, and grade point averages for use in the second country.

20. A system for converting educational credentials from a first country to credentials for a second country, comprising:
means for receiving first data from a user, the first data related to course grades and credits earned in the first country and a selection of the second country from among a plurality of countries, wherein the second country has a grading scale and a credit scale that is different from the grading scale and the credit scale of the first country;

means for retrieving second data from a database using a processor based on the first data, wherein the database comprises data related to grading scales and credit scales for educational credentials for a plurality of countries, the second data related to the grading scale and the credit scale of the second country, the database further comprising for each country and each grade weight: a country grade start field, a country grade end field, grade weight field, a grade weight start field, and a grade weight end field, the country grade start field and a country grade end field defining a range of country grades for a grade weight in the grade weight field, the grade weight start field and the grade weight end field defining an intermediate grade range for the grade weight in the grade weight field;

means for converting the course grades and credits earned in the first country to intermediate grades and intermediate credits, wherein the intermediate grades and the intermediate credits represent numeric values of the course grades and credits earned based on the grading scale and the credit scale of the first country, wherein the processor determines the intermediate grades using the course grades earned in the first country and the country grade weight start field and the country grade weight end field for the first country to determine a corresponding grade weight;

means for converting the intermediate grades and the intermediate credits to equivalent grades, credits, and grade point averages in the grading scale and the credit scale of the second country based on the second data using the processor, wherein the processor determines the grades of the second country using the corresponding grade weight and the country grade start field and the country grade end field for the second country in the database, and wherein the processor determines the grades of the second country using the corresponding grade weight and the country weight start field and the country weight end field for the second country; and means for providing the numeric grades, credits, and grade point average equivalent in the grading scale and the credit scale of the second country to the user, wherein the grades of the second country are provided as a range corresponding to the country weight start field and the country weight end field for the second country.

* * * * *